(12) United States Patent
Kollin et al.

(10) Patent No.: US 11,467,320 B2
(45) Date of Patent: Oct. 11, 2022

(54) HEAD MOUNTED DISPLAY DEVICE HAVING DYNAMICALLY ADDRESSABLE SHUTTER ARRAY

(71) Applicant: Microsoft Technology Licensing, LLC, Redmond, WA (US)

(72) Inventors: Joel Steven Kollin, Seattle, WA (US); Andreas Georgiou, Cambridge (GB); Brian K. Guenter, Redmond, WA (US); Charles Thomas Hewitt, Cambridge (GB); Mario Possiwan, Paris (FR); Ishan Chatterjee, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/134,009

(22) Filed: Dec. 24, 2020

(65) Prior Publication Data
US 2022/0206191 A1   Jun. 30, 2022

(51) Int. Cl.
*G02B 3/00* (2006.01)
*G02B 7/02* (2021.01)
(Continued)

(52) U.S. Cl.
CPC ........... *G02B 3/0006* (2013.01); *G02B 7/021* (2013.01); *G06F 3/013* (2013.01); *G09G 3/2085* (2013.01);
(Continued)

(58) Field of Classification Search
CPC .. G02B 3/0006; G02B 7/021; G02B 27/0176; G02B 30/31; G02B 27/0172; G02B 3/14;
(Continued)

(56) References Cited

U.S. PATENT DOCUMENTS

| 8,044,881 B2 | 10/2011 | Nam et al. |
| 8,810,567 B2 | 8/2014 | Niioka et al. |

(Continued)

FOREIGN PATENT DOCUMENTS

| EP | 3526967 B1 | 9/2020 |
| KR | 20080043601 A | 5/2008 |

(Continued)

OTHER PUBLICATIONS

Ratcliff, et al., "ThinVR: Heterogeneous microlens arrays for compact, 180 degree FOV VR near-eye displays", In Journal of IEEE Transactions on Visualization and Computer Graphics, vol. 26, No. 5, May 2020, pp. 1981-1990.

(Continued)

*Primary Examiner* — Richard J Hong
(74) *Attorney, Agent, or Firm* — Rainier Patents, P.S.

(57) ABSTRACT

This document relates to head mounted display devices. One example can include a layer of individually controllable pixels that can be energized to emit light and a layer of lenses that are physically aligned over the pixels. The example can also include a layer of shutters interposed between the pixels and the lenses and configured to be independently transitioned between a transmissive state and an opaque state to limit paths of the emitted light that reach the layer of lenses.

17 Claims, 22 Drawing Sheets

(51) Int. Cl.
*G06F 3/01* (2006.01)
*G09G 3/20* (2006.01)

(52) U.S. Cl.
CPC ............... *G09G 2320/0209* (2013.01); *G09G 2320/0252* (2013.01); *G09G 2340/0428* (2013.01)

(58) Field of Classification Search
CPC ...... G02B 27/106; G02B 5/23; G02B 27/283; G06F 3/013; G09G 3/2085; G09G 2320/0209; G09G 2320/0252; G09G 2340/0428; G02F 1/1335; G02F 1/13306
See application file for complete search history.

(56) References Cited

U.S. PATENT DOCUMENTS

| | | | |
|---|---|---|---|
| 8,953,108 B2 | 2/2015 | Chen | |
| 9,077,987 B2 | 7/2015 | Lee et al. | |
| 9,576,398 B1* | 2/2017 | Zehner | G02B 27/0172 |
| 10,613,352 B2 | 4/2020 | Knoll | |
| 10,679,518 B2 | 6/2020 | Halpin et al. | |
| 10,817,052 B1* | 10/2020 | Lu | G02B 3/14 |
| 10,989,926 B1* | 4/2021 | Matsuda | G02B 27/283 |
| 2011/0216252 A1* | 9/2011 | MacNaughton | G02F 1/1335 |
| | | | 349/15 |
| 2015/0002940 A1 | 1/2015 | Nister et al. | |
| 2016/0011422 A1* | 1/2016 | Thurber | G02B 27/0176 |
| | | | 345/8 |
| 2016/0165219 A1 | 6/2016 | Tokuhara et al. | |
| 2016/0313558 A1 | 10/2016 | Gutierrez | |
| 2016/0353098 A1* | 12/2016 | Stein | G02B 27/0172 |
| 2017/0115432 A1 | 4/2017 | Schmidtlin | |
| 2017/0192158 A1 | 7/2017 | Lee et al. | |
| 2018/0188538 A1* | 7/2018 | Bell | G02B 5/23 |
| 2019/0094981 A1 | 3/2019 | Bradski et al. | |
| 2020/0110198 A1 | 4/2020 | Deng | |
| 2020/0271948 A1* | 8/2020 | Momonoi | G02B 30/31 |
| 2020/0292812 A1* | 9/2020 | Kollin | G02F 1/13306 |
| 2021/0080721 A1* | 3/2021 | Geng | G02B 27/106 |

FOREIGN PATENT DOCUMENTS

| | | |
|---|---|---|
| KR | 101255713 B1 | 4/2013 |
| WO | 9938046 A1 | 7/1999 |

OTHER PUBLICATIONS

"International Search Report and Written Opinion Issued in PCT Application No. PCT/US21/061501", dated Mar. 17, 2022, 13 Pages.

* cited by examiner

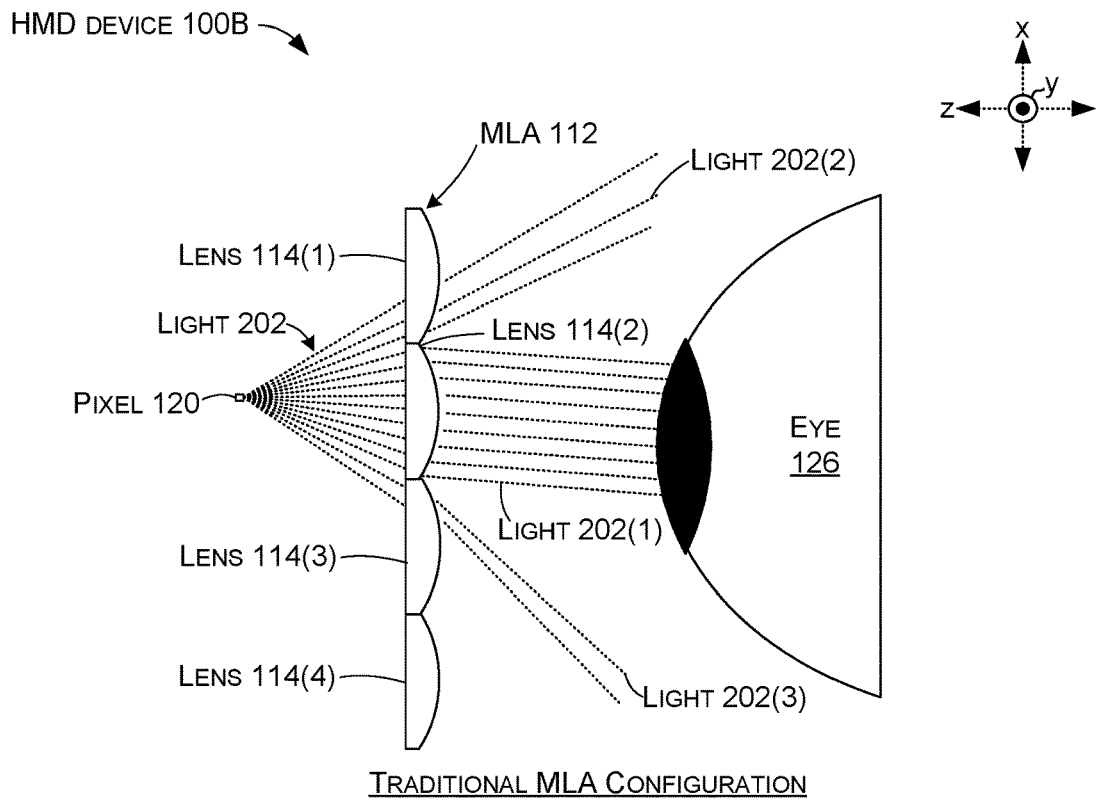
TRADITIONAL MLA CONFIGURATION
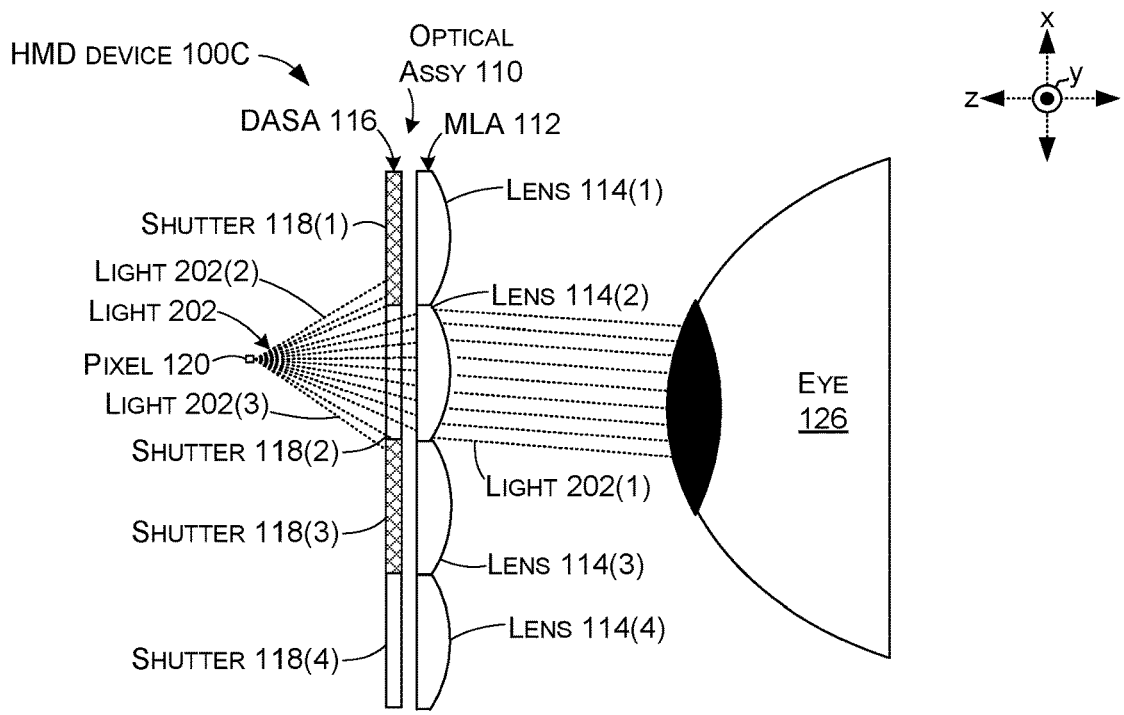
DYNAMICALLY ADDRESSABLE SHUTTER ARRAY (DASA) AND MLA
FIG. 2

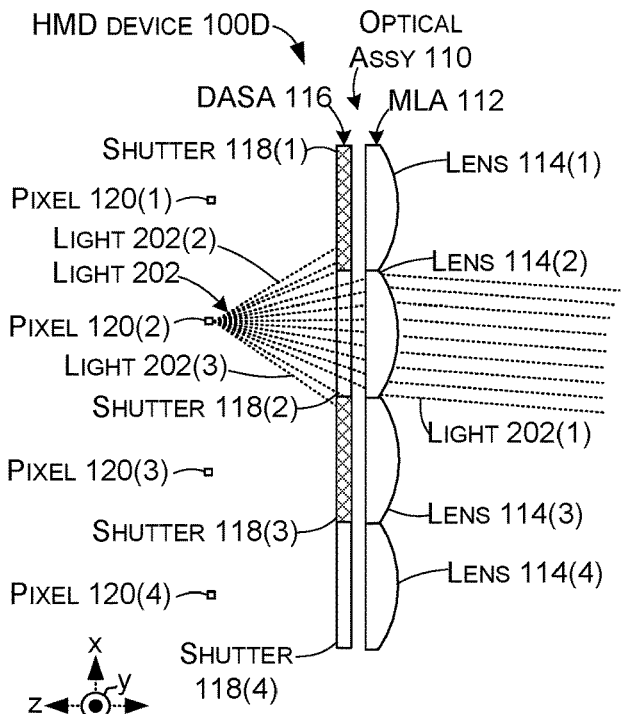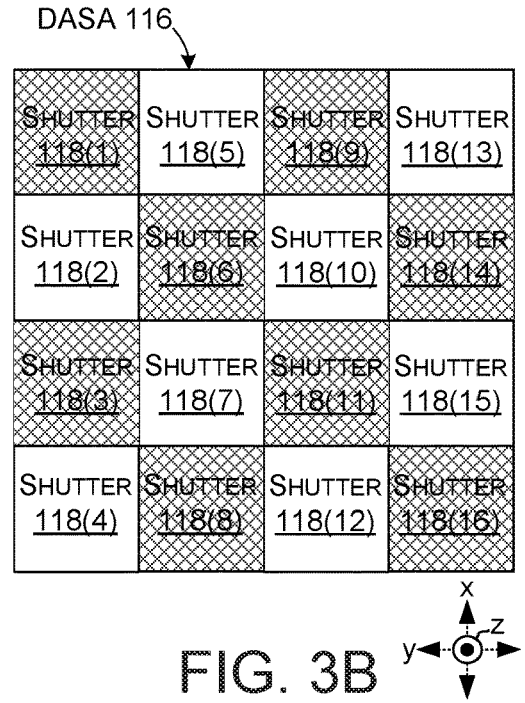
FIG. 3A    FIG. 3B
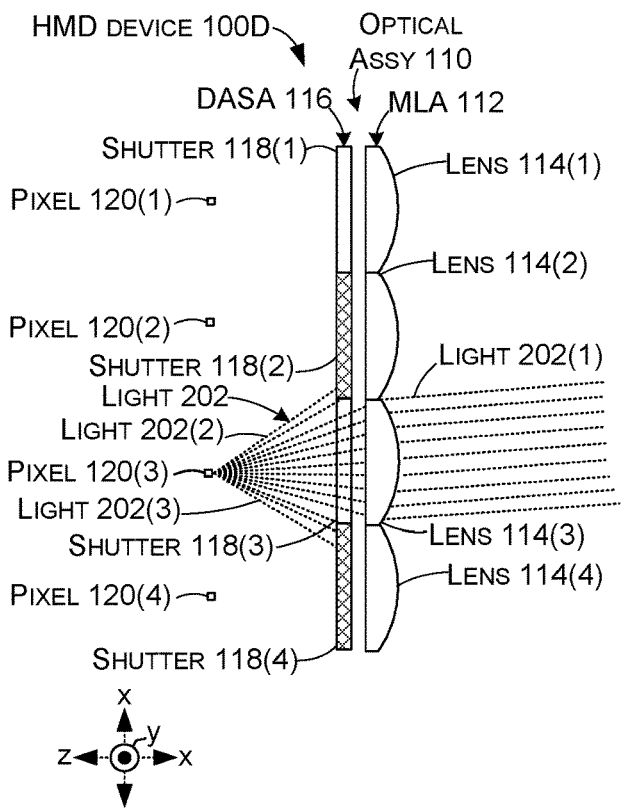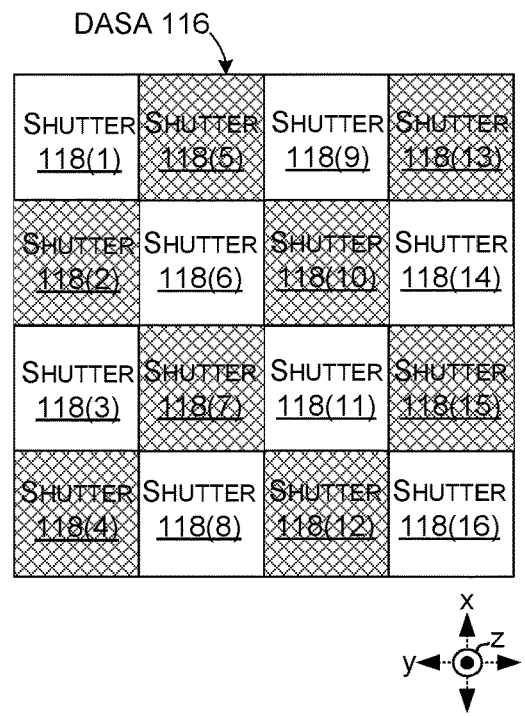
FIG. 3C    FIG. 3D

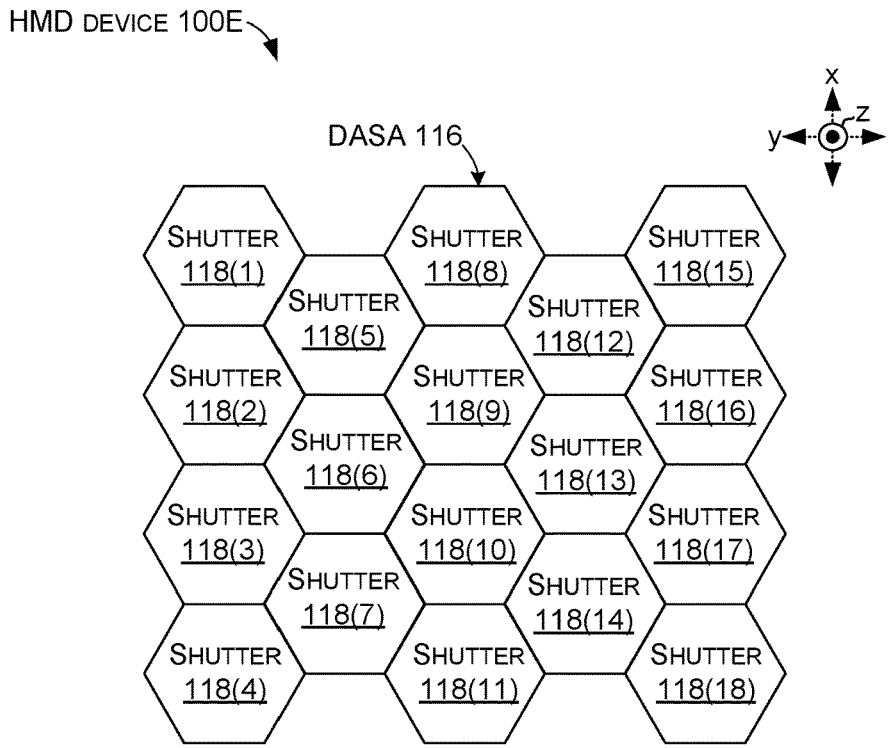
INSTANCE 402 - ALL SHUTTERS OPEN
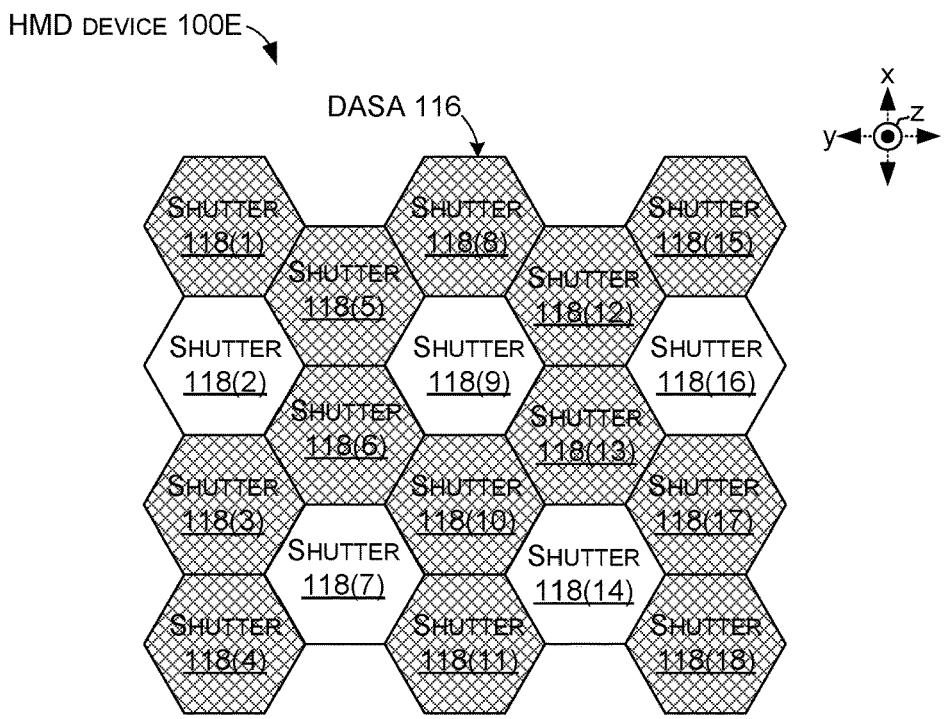
INSTANCE 404 - ADJACENT SHUTTERS CLOSED
FIG. 4

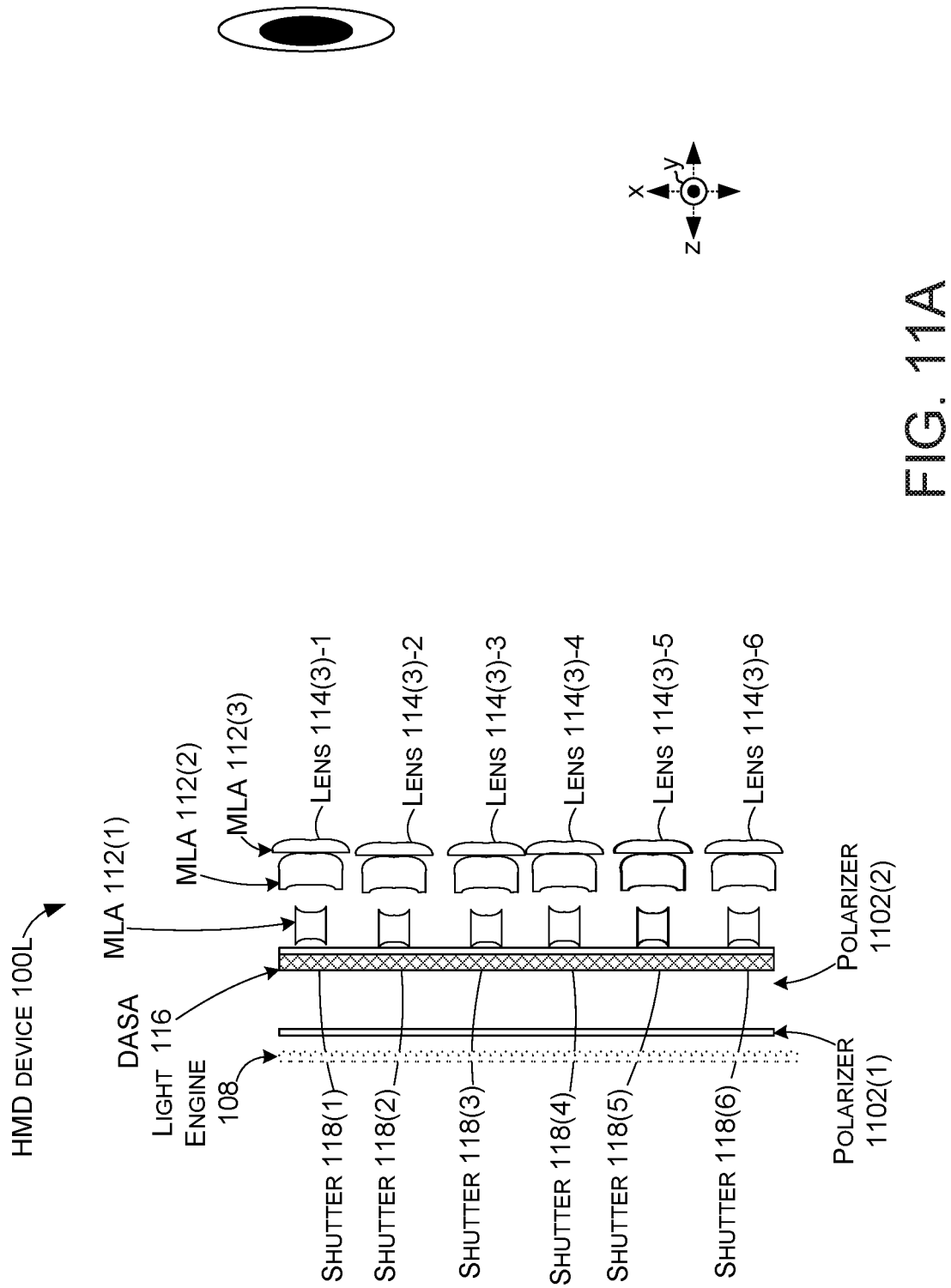

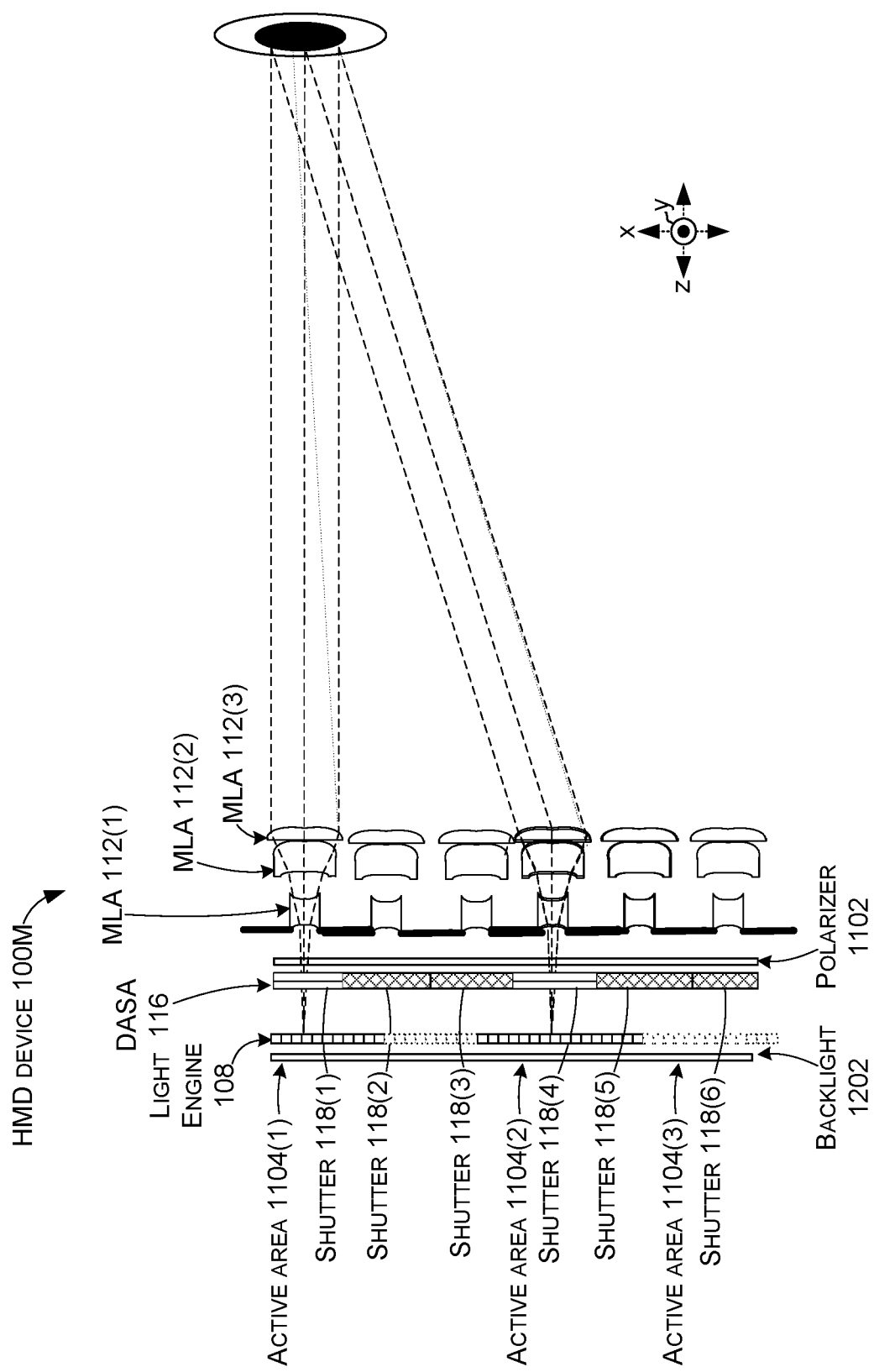

HEAD MOUNTED DISPLAY DEVICE HAVING DYNAMICALLY ADDRESSABLE SHUTTER ARRAY

BACKGROUND

Head mounted display devices can enable users to experience immersive virtual reality scenarios. Such technology may be incorporated into a device in the form of eyeglasses, goggles, a helmet, a visor, or some other type of head-mounted display (HMD) device or eyewear. In order for the HMD device to be comfortable for any length of time, the head mounted display should be positioned relatively closely to the user's face (e.g., eyes) and should be relatively light weight.

Existing configurations tend to employ a single lens to focus the image for receipt by the user's eye. However, a single lens tends to be bulky and heavy which precludes the desired lightweight and compact form factor. Recently, attempts have been made to replace the large single lens with a multi-lens array (MLA). Unfortunately, several phenomena have diminished image quality of HMD devices employing an MLA. For instance, light intended for one lens of the MLA can bleed over into adjacent lenses (e.g., crosstalk). This crosstalk can diminish image quality. The present concepts can address these and other issues that are hampering the potential of MLA HMD devices.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items. In some figures where multiple instances of an element are illustrated, not all instances are designated to avoid clutter on the drawing page.

FIGS. 1B, 2, 3A-3D, 4, 5A, 5B, 5C, 6, 7A, 7B, 8-14, 15A-15C, and 16 illustrate elevational views of example HMD devices that are consistent with some implementations of the present concepts.

DETAILED DESCRIPTION

Overview

Head-mounted display (HMD) devices can present virtual content to a user. The content or imagery is typically reproduced over an image area called an "eye box" that can correspond to various positions and angular directions associated with the user's eye. However, for traditional HMD devices, reproduction of an image having a wide field of view (FOV) can be difficult, as existing techniques for displaying a high FOV image typically attempt to optimize the image over the entire eye box in order to account for a user's eye movement in any direction, along with variances in eye shape and size. This full eye box image optimization subsequently results in an overly heavy and expensive HMD device in order to perform such optimization, as complex, expensive, and bulky optical components can be used in order to perform such optimization. Alternative traditional designs employ a single optical element, such as a single lens. While simplifying the design and cost, a single lens results in inefficiencies because much of the light never reaches the eye box and/or is not properly collimated to provide a clear image for the user. In addition, the focal length of the lens is typically limited to be longer than its diameter, so a single lens system will result is a total track length (TTL) which is greater than what would be desired for an HMD. Multi-lens array (MLA) configurations have been tested, but results are below market expectations. One difficulty with MLAs is light passing through unintended lenses, such as those adjacent to the target lens. This light can diminish image quality. The present concepts relate to employing dynamically addressable shutter arrays (DASAs) in association with an MLA to control where and when light reaches the MLA.

Figure 1A:
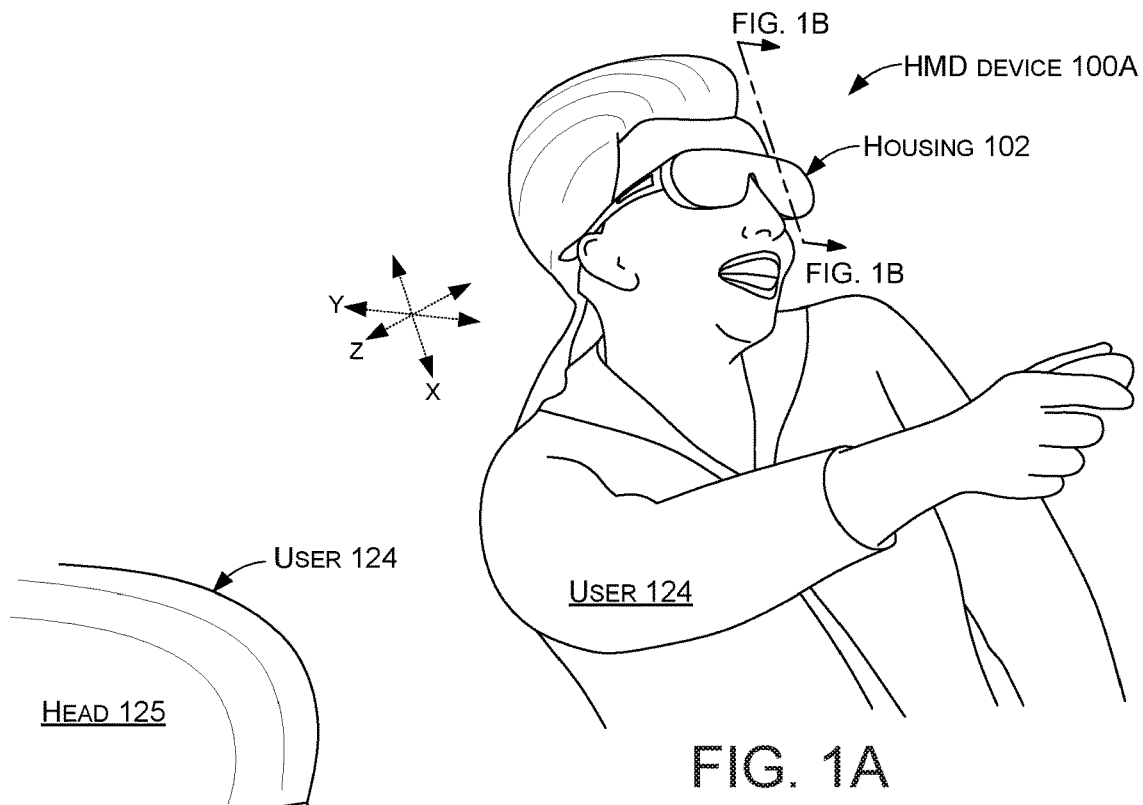
FIG. 1A illustrates a perspective view of an example HMD device that is consistent with some implementations of the present concepts.
Figure 1B:
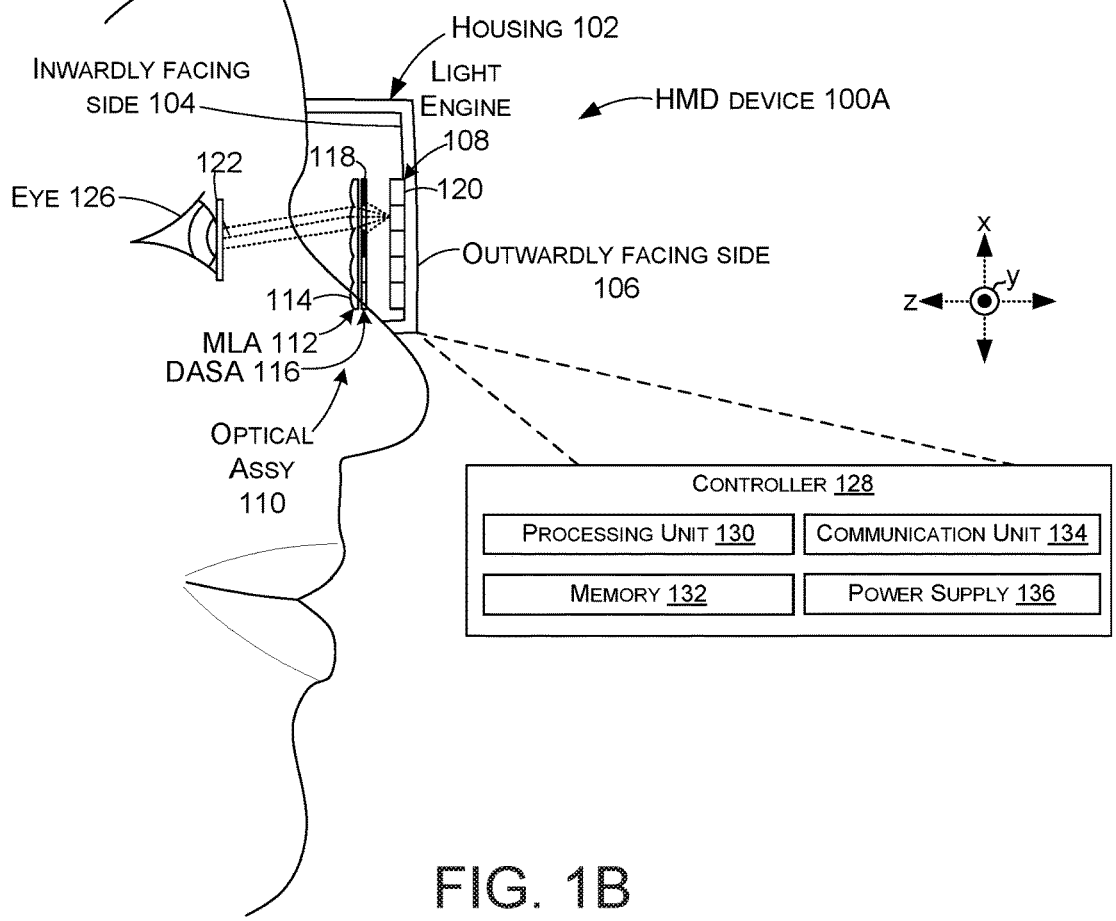

FIGS. 1A and 1B collectively depict an example HMD device 100 which can implement the present concepts. HMD device 100 can include a housing 102. The housing can define an inwardly facing side 104 and an outwardly facing side 106. The housing 102 can also orient a light engine 108 and an optical assembly 110. The optical assembly 110 can include one or more MLAs 112 that include lenses 114. The optical assembly 110 can also include a dynamically addressable shutter array (DASA) 116. In this case, the DASA 116 is interposed between the light engine 108 and the MLA 112. The DASA 116 can include multiple independently controllable shutters 118. Individual shutters 118 can have a transmissive state (e.g., open) and a blocking or opaque state (e.g., closed).

The light engine 108 can include individually addressable physical points (e.g., pixels) 120 that can be controlled to emit light (represented by dotted lines). The pixels 120 can also be viewed as independently controllable elements. Light engine 108 can control the pixels 120 to generate light rays representing an image. The light engine 108 may be any sort of device or display capable of emitting light from the pixels, such as light emitting diodes, laser diodes, organic light emitting diodes (OLEDS), and/or inorganic light emitting diodes (ILEDS), among others. The individual pixels 120 can be driven according to one or more parameter values, such as power level, to produce the light of a corresponding light intensity, color, etc. to produce the corresponding image. Alternatively, the light engine can be a device or display panel which modulated light emitted from an external source or backlight, such as a liquid crystal display (LCD).

The DASA 116 can control which pathways of light from the pixels reach the MLA 112 and which are blocked. Light that reaches the MLA 112 can be operated upon by the lenses 114 to contribute to formation of the image at an eye box 122. A user 124 can wear the HMD device 100. For instance, the inwardly facing side 104 of the housing 102 can be configured to be positioned toward and/or against a head 125 of the user (e.g., engaged by the user's head) so that the optical assembly 110 can present the eye box 122 at an eye 126 of the user. Note that while the sectional view of FIG. 1B shows one eye, another light engine 108 and another optical assembly 110 can be positioned relative to the other eye to create stereoscopic effects.

The head mounted display device 100 can also include a controller 128, a processing unit 130, storage and/or memory 132, a communication unit 134, and/or a power supply 136. In some implementations controller 128 may include the processing unit 130 and the memory 132. The controller can utilize the memory for storing processor readable instructions and/or data, such as user data, image data, etc. The communication unit 134 can be communicatively coupled to the processing unit 130 and can act as a network interface for connecting the HMD device to another computer system.

Controller 128 may provide commands and instructions, such as driving power to the pixels 120 of the light engine 108 to generate images for a virtual visualization. Similarly, the controller can set the state of shutters 118 of the DASA 116 while the light is being emitted from the pixels. In some implementations, the controller 128 can also receive eye-tracking information that can be used by processing unit 130 as input for controlling light engine 108 and DASA 116 to generate and deliver light based upon the user (e.g., eye position and/or gaze direction).

Processing unit 130 may include one or more processors including a central processing unit (CPU) and/or a graphics processing unit (GPU). Memory 132 can be a computer-readable storage media that may store instructions for execution by processing unit 130, to provide various functionality to HMD device 100. Finally, power supply 136 can provide power for the components of controller 128 and the other components of HMD device 100, such as light engine 108 and additional components that may be included in HMD device 100, such as image capture devices (e.g., cameras), audio devices (e.g., microphones and speakers), and/or location/motion capture devices (e.g., accelerometers).

From another perspective the light engine 108 can generate light rays corresponding to image data. The DASA 116 can control which light rays reach the MLA 112. The light rays that reach the MLA 112 can be focused and collimated by the lenses of 114 to "paint" the image over the eye box 122 corresponding to a user's eye 126. The eye box 122 can be defined as a range of possible pupil positions (e.g., locations) and gaze directions of a user's eye. Due to the variability of head sizes and the variability of interpupillary distances of users of the HMD device, and because it is difficult to know exactly where a user's gaze may be directed, the HMD device typically optimizes the generated image for a substantial range of image angles and pupil positions in order to account for all possible positions of a user's eye. However, some of the present implementations can utilize information about the eye location, gaze direction, and/or pupil size to customize eye box formation.

FIGS. 2-16 collectively introduce structural details of several example HMD devices.

FIG. 2 contrasts an HMD device 100B that represents a traditional MLA configuration with an example HMD device 100C that employs a configuration that combines a DASA 116 with an MLA 112.

In the traditional MLA configuration of HMD 1008, when light 202 is emitted from a pixel 120, some of the light 202(1) passes through target lens 114(2) to contribute to the image perceived by the eye 126. Other light 202(2) and 202(3) passes through adjacent lenses 114(1) and 114(3), respectively and can generate what can be referred to as 'cross talk.' This light 202(2) and 202(3) can diminish image quality, such as by reducing image contrast, and can be considered as 'noise' relative to the image.

In this traditional configuration, MLAs facilitate having shorter track length and especially working distances over conventional eyepiece designs. However, the angular resolution (Pixels Per Degree) is limited by the ratio of the focal length of the lenses to the display pixel size. Also, crosstalk (pixels being seen by multiple lens at the same time) significantly reduces image quality. The use of fixed light barriers (baffles) restricts the flexibility of the display to be used with varying eye positions as well as taking into account differing geometries of users wearing the display. The use of such fixed barrier would also limit the effective resolution below that of the native panel resolution (e.g., below the resolution of the light engine). These and other issues can be addressed by HMD device 100C, which includes some of the present concepts.

HMD 100C can include DASA 116 with independently controllable shutters 118. In this example, shutter 118(2) can be open to allow light to pass through, while adjacent shutters 118(1) and 118(3) are closed. Thus, light 202 can be targeted to a specific lens 114(2). Closing shutters 118(1) and 118(3) can block light 202(2) and 202(3) that would otherwise reach lenses 114(1) and 114(3). Opening shutter 118(2) allows light 202(1) to reach the target lens 114(2) to contribute to image generation for the user's eye 126. Light 202(2) and 202(3) is blocked and any image degradation associated with this light can be reduced and/or eliminated. Thus, the present concepts can offer substantially improved image quality and resolution over traditional MLA HMD devices.

FIGS. 3A-3D collectively show another example HMD device 100D. In this example, the DASA 116 includes a 4×4 array of shutters 118. Similarly, while only a single column of lenses 114 and pixels 120 are shown, they can also be in a 4×4 array. Thus, in this example there is a one-to-one-to-one ratio between pixels 120, shutters 118, and lenses 114. Other implementations can have other ratios. While a 4×4 array is shown for ease of illustration, this array can be considered as a portion of a larger arrays that includes hundreds or thousands of shutters. Other implementations may employ many more pixels, shutters, and/or lenses. For instance, an array of 100×100 per square inch of display area could be employed.

FIGS. 3A-3D also illustrate how the shutters 118 can be controlled to collectively form a high-quality image. For purposes of explanation, the HMD device 100D can present images to the user at a given frequency or refresh rate (e.g., cycles per second). As shown in FIGS. 3A and 3B for a first portion (e.g., sub-frame) of a given cycle (e.g., frame), pixel 120(2) can be powered on and shutter 118(2) can be opened while adjacent shutters 118(1), 118(3), and 118(6) are closed. Thus, for the first portion of the cycle, light 202 from pixel 120(2) effectively only reaches the eye box through lens 114(2). As shown in FIGS. 3C and 3D for a second portion of the given cycle, pixel 120(3) can be powered on and shutter 118(3) can be opened while adjacent shutters 118(2), 118(4), and 118(7) are closed. Thus, for the second portion of the cycle, light 202 from pixel 120 effectively only reaches the eye box through lens 114(3). As long as the cycles are relatively short, such as 1/60 of a second, the user will tend to perceive a single image that is the sum of the two portions. This image can be produced with less processing and display resources than previous technologies. The user will tend to perceive the image to have higher quality and contrast than would be the case if a single pixel was activated for the entire cycle. This facet offers another way that the present concepts can offer substantially improved image quality and resolution over current MLA HMD devices.

FIG. 4 shows another example HMD device 100E employing a DASA 116. In this case, the shutters 118 of the DASA 116 are arranged in a hexagonal array (e.g., honeycomb) rather than the checkerboard array of FIGS. 3B and 3D. The hexagonal array can effectively prevent image degradation associated with cross talk. Instance 402 shows all shutters 118 open so light can pass through. Instance 404 shows shutters 118(2), 118(9), 118(16), 118(7), and 118(14) open. All shutters 118 adjacent to the open shutters can be closed. Thus, shutters 118(1), 118(3), 118(4), 118(5), 118(6), 118(8), 118(10), 118(11), 118(12), 118(13), 118(15), 118 (17), and 118(18) are closed. This configuration provides the technical solution of effectively blocking cross talk and thereby enhances image quality. Other shutter geometries are contemplated beyond the illustrated checkerboard and hexagonal patterns, which are illustrated for purposes of explanation.

Figure 5A:
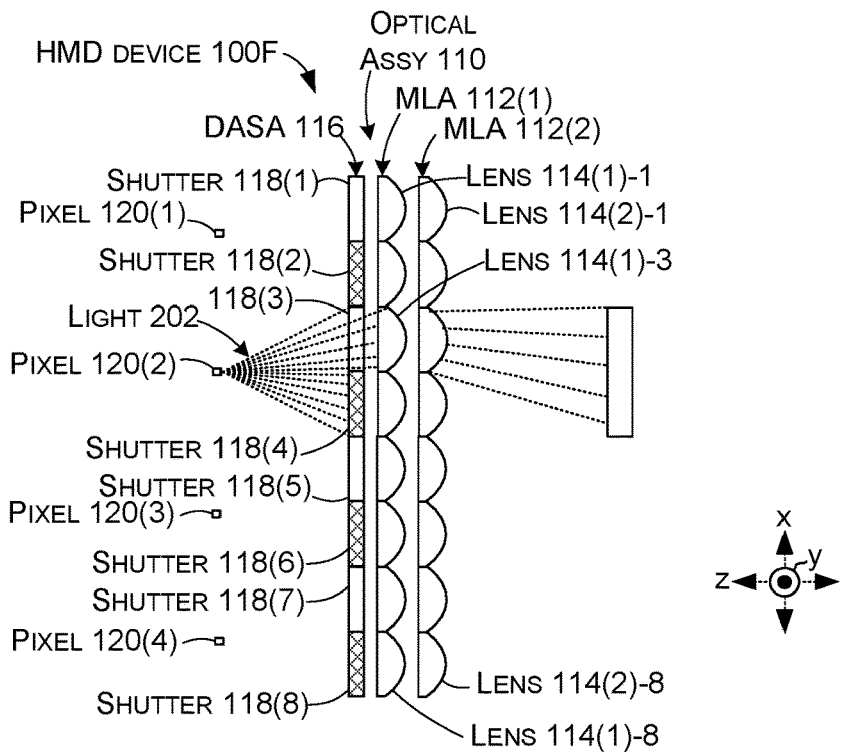
Figure 5B:
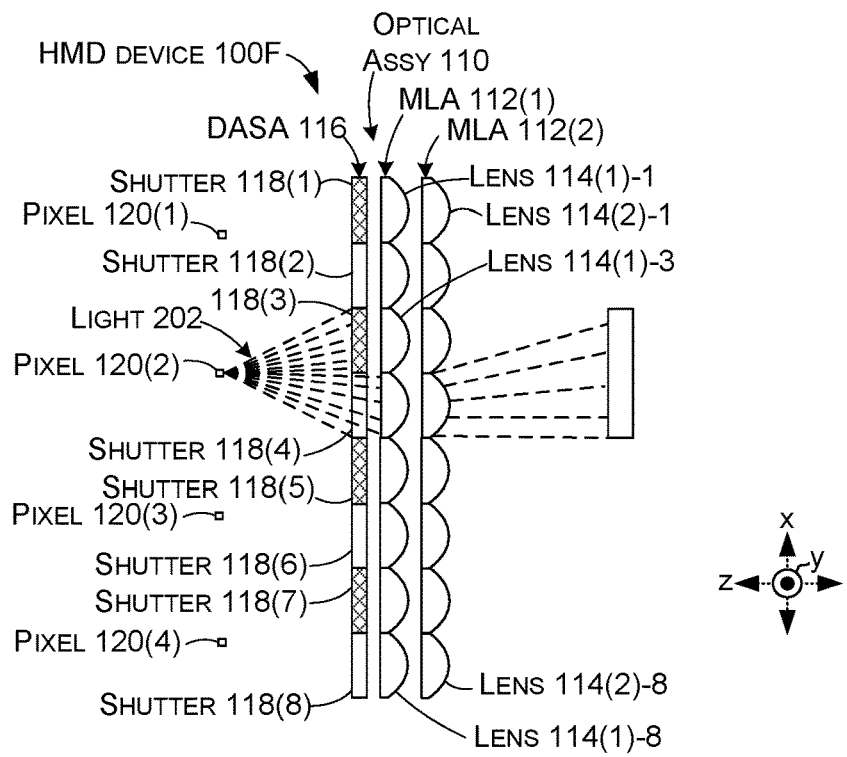
Figure 5C:
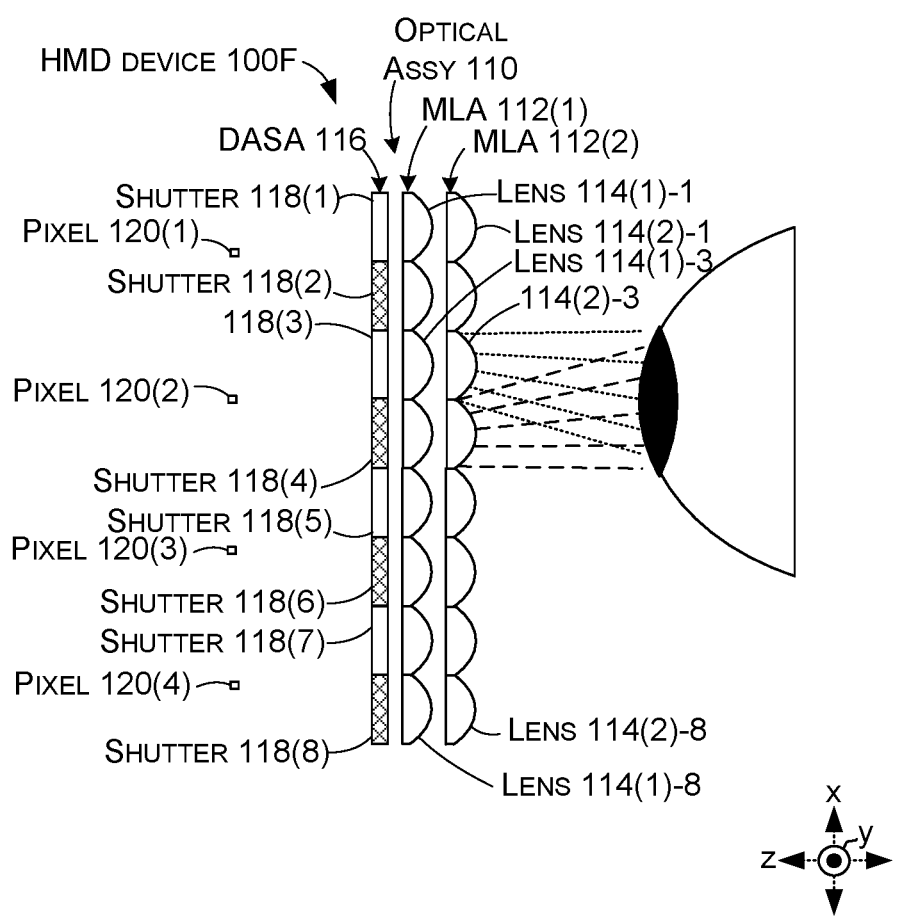

FIGS. 5A-5C collectively show another example HMD device 100F that is similar to HMD device 100D described above relative to FIGS. 3A-3D. This example includes multiple MLAs 112: two MLAs 112(1) and 112(2) are illustrated in this case. In this implementation there is a one-to-two-to-two ratio between pixels 120, shutters 118, and lenses 114 of the first MLA 112(1). FIGS. 5A and 5B also illustrate how the shutters 118 can be controlled to allow an individual pixel, such as pixel 120(2) to contribute multiple times to a perceived image. This process can be roughly analogous to processes such as interlacing and/or wobulation, and can produce an image resolution that is greater than the number of pixels. The HMD device 100F can present images to the user at a given frequency or refresh rate (e.g., cycles per second). As shown in FIG. 5A for a first portion (e.g., sub-frame) of a given cycle (e.g., frame), pixel 120(2) can be powered on and shutter 118(3) can be opened while adjacent shutters 118(2) and 118(4) are closed. Thus, for the first portion of the cycle light 202 from pixel 120(2) effectively only reaches the eye box through lens 114(1)-3. As shown in FIG. 5B for a second portion (e.g., sub-frame) of the given cycle, pixel 120(2) can continue to be powered and shutter 118(3) can be opened while adjacent shutters 118(2) and 118(4) are closed. Thus, for the second portion of the cycle, light 202 from pixel 120(2) effectively only reaches the eye box through lens 114(2)-4. As long as the cycles are relatively short, such as 1/60 of a second or less, the user will tend to perceive a single image that is the sum of the two portions (e.g., two sub-frames). As shown in FIG. 5C, the user will tend to perceive the image to have higher resolution and/or contrast than would be the case if a single pixel was activated for the entire cycle along a single light path. This facet offers another way that the present concepts can offer substantially improved image quality and resolution over current MLA HMD devices. For instance, assume that the cycle period is 1/60 of a second, for example. Shutter 118(3) can be open from a first portion (1/120) of the cycle time and contribute light to the image free of cross talk and shutter 118(4) can be open for the second portion (1/120) of the cycle time and contribute light to the image free of cross talk. The user's mind tends to fuse these two images and perceive a higher resolution, higher contrast image than would otherwise be the case. Thus, the DASA solves the technical problem associated with the extensive cross talk and image degradation that would otherwise occur with small adjacent lenses in an MLA.

Figure 6:
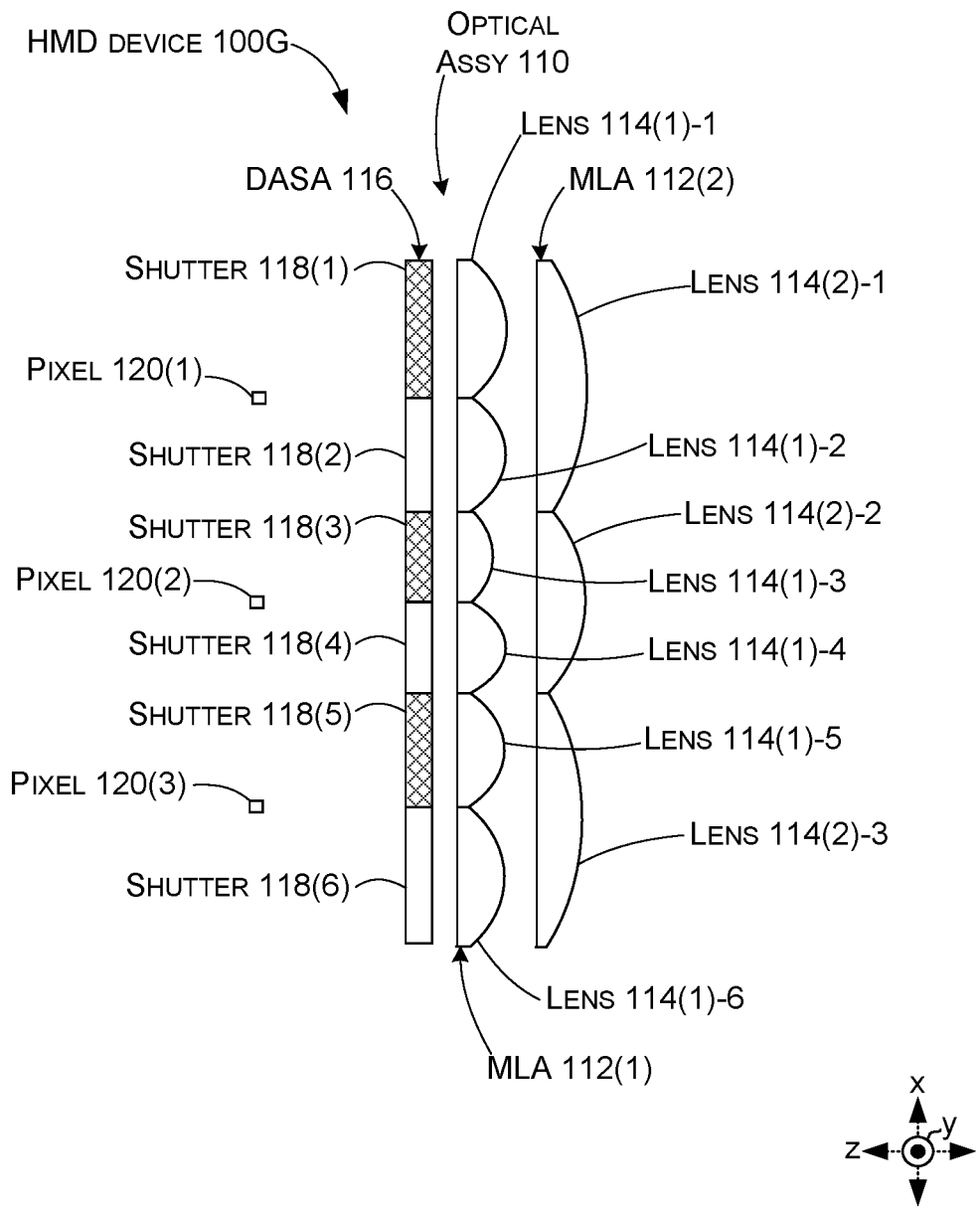

FIG. 6 shows another example HMD device 100G. In this case, the diameters of the shutters 118 are not uniform. In this example, the diameters of the shutters 118 are smaller toward the center of the DASA 116 and larger toward the edges of the DASA. For instance, shutters 118(3) and 118(4) are centrally located and are smaller in diameter than shutters 118(2) and 118(5). In turn, shutters 118(2) and 118(5) have smaller diameters than shutters 118(1) and 118(6), which are positioned on the periphery of the DASA 116. Thus, for one perspective, the shutters can be viewed as concentric circles (e.g., bullseye) of shutters that have progressively larger diameters with increasing distance from the center of the DASA. This is one method to create a variation of resolution so that there is higher resolution the toward the center of the image. This can be advantageous in that the center of the image tends to correspond to the user's foveal vision, and lower resolution corresponding to peripheral vision tends not to be noticed by the user.

In this example, the size and position of the shutters 118 corresponds to the size and position of the adjacent lenses 114(1) of MLA 112(1). The lenses 114(1) increase is diameter toward the periphery of the MLA 112(1). The lenses 114(1) operate cooperatively with lenses 114(2) of MLA 112(2) to generate images for the user. Shutters 118 of the DASA 116 can be dynamically and independently opened and closed to facilitate this image formation and to reduce and/or eliminate crosstalk.

Figure 7A:
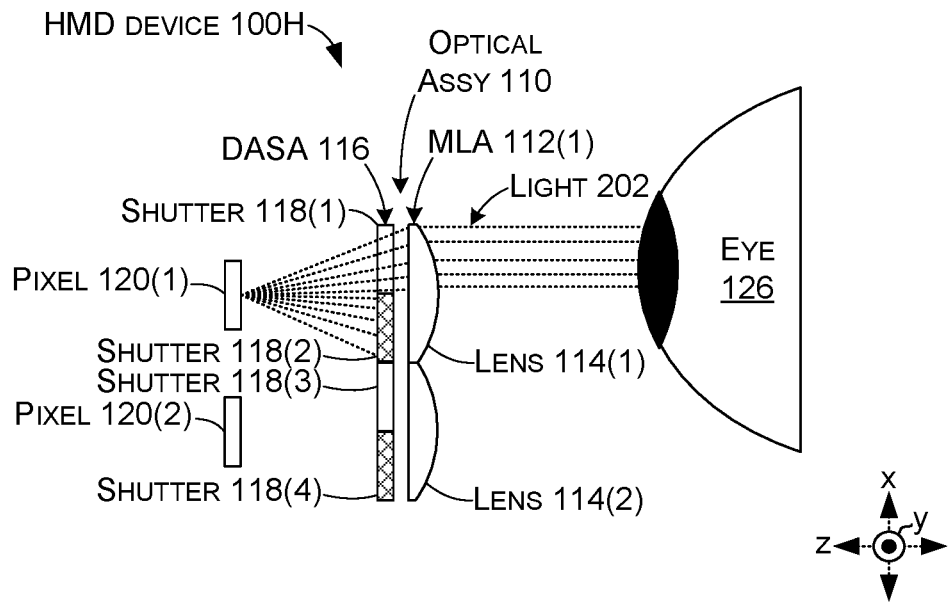
Figure 7B:
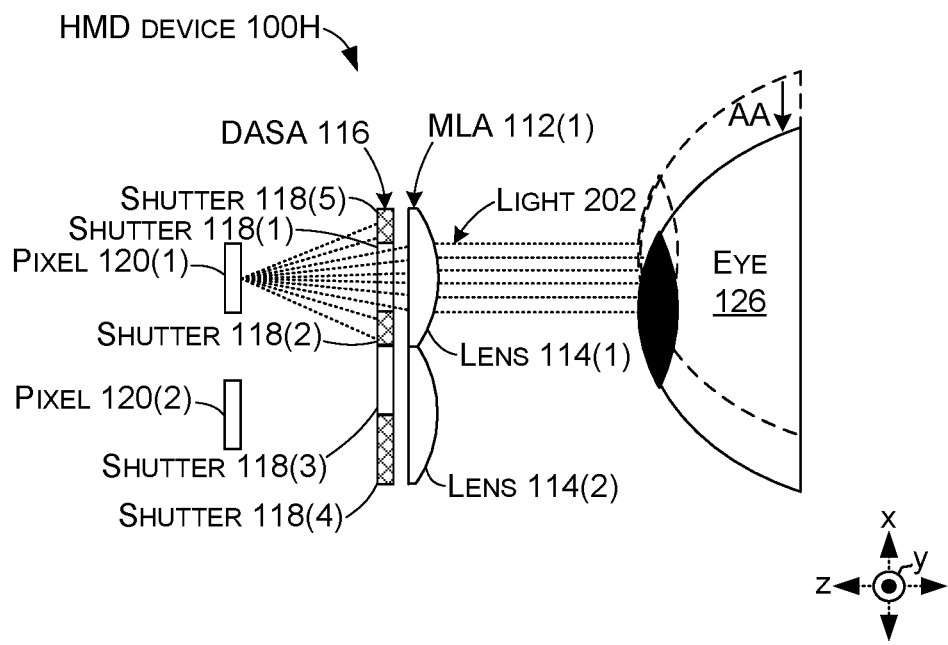

FIGS. 7A and 7B collectively show another example HMD device 100H. In this case, the location of the shutters 118 can be determined based upon one or more parameters associated with the HMD device 100G. The parameters can include parameters associated with the user, such as eye location and/or gaze direction. FIG. 7A shows an initial configuration with the eye 126 at a first position and pixel 120(1) generating light 202. The light is passing through open shutter 118(1), but is blocked by closed shutter 118(2).

FIG. 7B shows a second configuration responsive to the eye movement indicated by arrow AA. In addition to the eye's motion as a function of gaze angle, eye movement could occur if the user's head shifts relative to the HMD device. Alternatively, the movement could occur if a different user with a different interpupillary distance (IPD) puts on the HMD device and the same content is generated for that user. In this case, open shutter 118(1) has been shifted downward parallel with the eye movement and shutter 118(5) has replaced the upper portion previously occupied by shutter 118(1). Viewed from another perspective, the shutter has not actually moved, but rather the portions of the DASA 116 that are open and closed has shifted. Shifting the position of the open shutter can keep the image generated in FIG. 7B consistent with (and potentially identical to) the image generated in FIG. 7A. An example mechanism that can accomplish this shutter shift is described below relative to FIGS. 15A-15C. In such a case, an individual shutter may itself entail an array of dynamically addressable elements. Groups of elements can be controlled to provide the desired shutter functionality for a given scenario (e.g., frame to frame and/or sub-frame to sub-frame).

Figure 8:
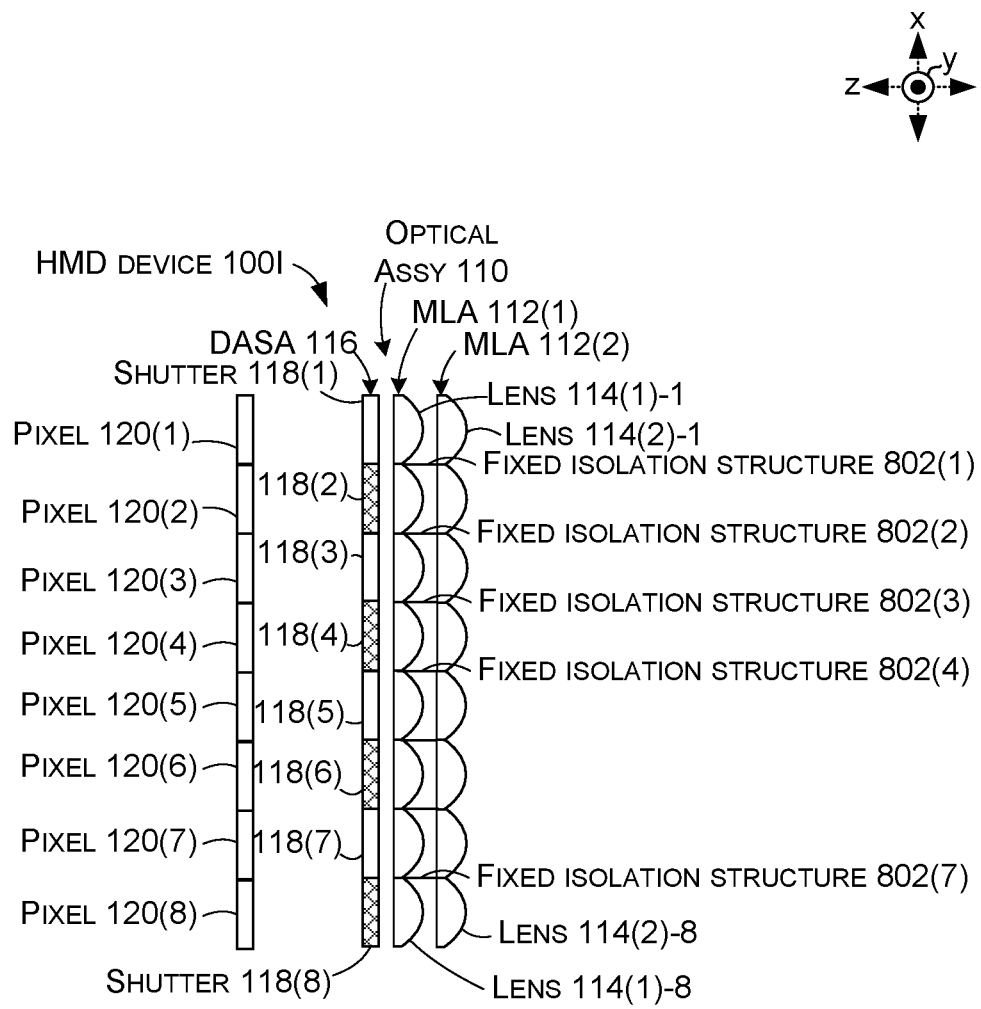

FIG. 8 shows another example HMD device 100I. In this case, the DASA 116 is interposed between the pixels 120 and first MLA 112(1). Fixed isolation structures 802 are positioned between lenses of MLA 112(1) and 112(2). The fixed isolation structures can optically isolate pairs of lenses from the adjacent MLAs. This can allow the fixed isolation structures 802 to prevent crosstalk associated with light leaving lenses 114(1) of MLA 112(1) and reaching multiple lenses 114(2) of MLA 112(2). Instead, the fixed isolation structures maintain a one-to-one relationship between the pairs of lenses. For instance, light from lens 114(1)-1 can reach lens 114(2)-1, but is blocked by fixed isolation structure 802(1) from adjacent lens 114(2)-2.

Figure 9:
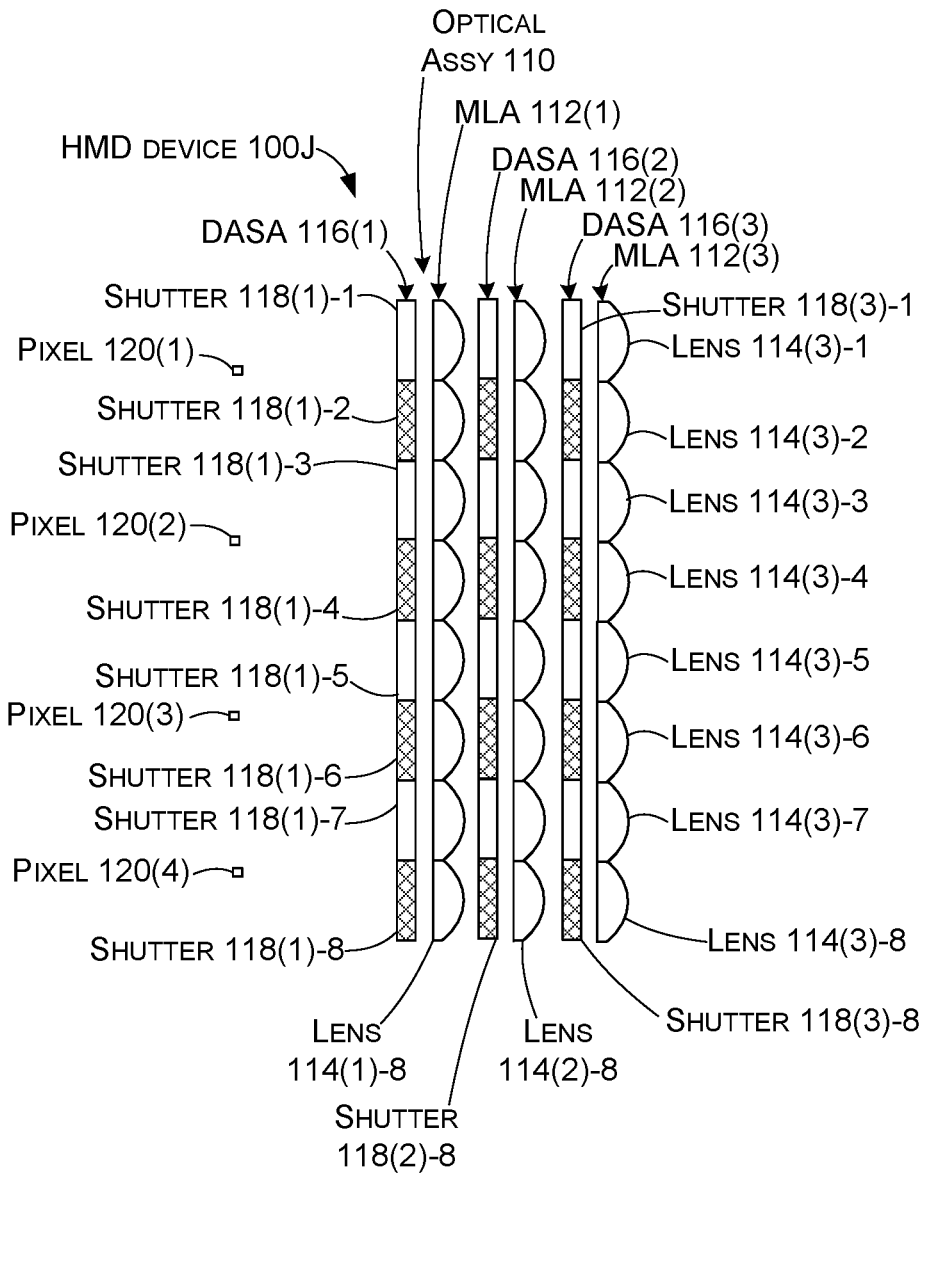
Figure 10:
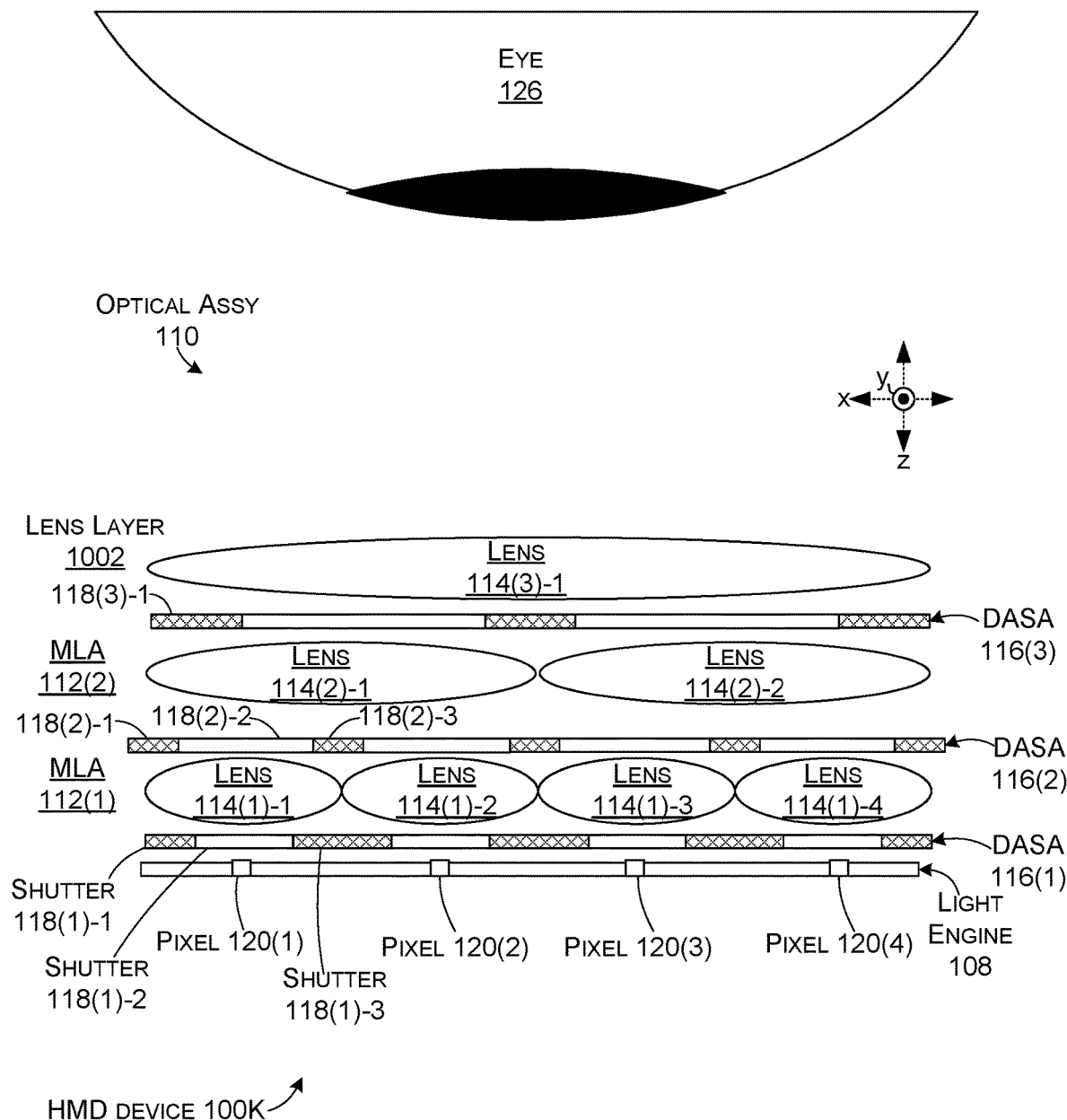

FIG. 9 shows another example HMD device 100J. In this case, DASA 116(1) is interposed between the pixels 120 and first MLA 112(1). Another DASA 116(2) is interposed between first MLA 112(1) and second MLA 112(2). Still another DASA 116(3) is interposed between second MLA 112(2) and third MLA 112(3). Each DASA can be controlled independently to achieve a desired light path while blocking other light paths. In this implementation, the lenses 114 of the three MLAs 112 are identical to one another. FIG. 10 shows an alternative configuration where the lenses of the individual MLAs are different from one another. While FIG. 9 shows three MLAs 112 and three DASAs 116, other implementations could include fewer or more. For instance, one implementation can employ two MLAs 112 and two DASAs 116. Another implementation can employ four MLAs 112 and four DASAs 116, for example.

FIG. 10 shows another example HMD device 100K. This example HMD device includes three lens layers. The first two lens layers are MLAs 112(1) and 112(2). In this case, the third lens layer is manifest as a single lens 114(3)-1 and as such is designated as lens layer 1002, rather than as an MLA 112. However, the third (and/or additional layers) could also be manifest as MLAs. Example numbers, locations, widths/diameters, and/or opened/closed states of the various shutters 118 are shown for purposes of explanation to enhance image generation and/or reduce image degradation from cross talk. Other configurations are contemplated.

Figure 11B:
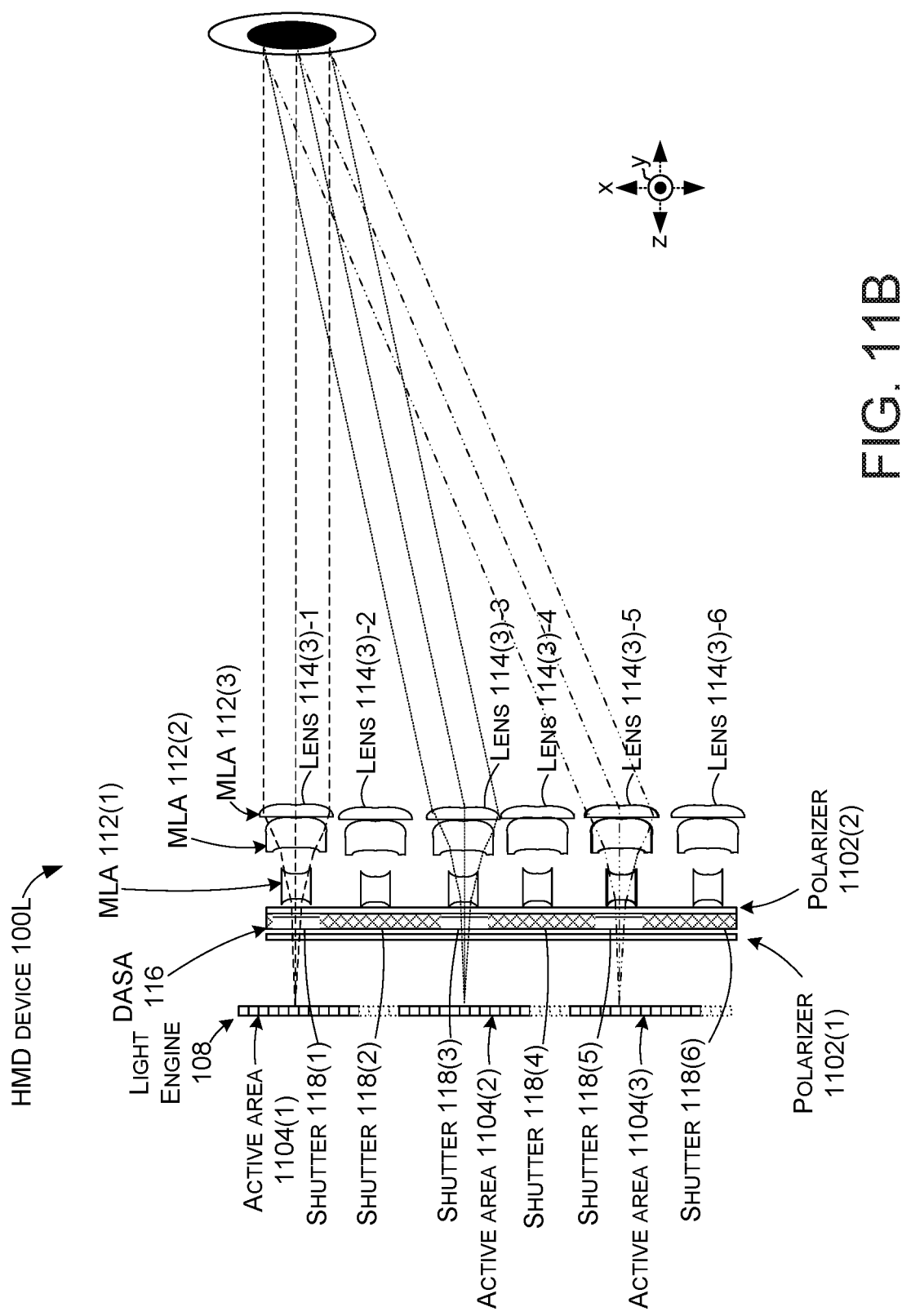
Figure 11C:
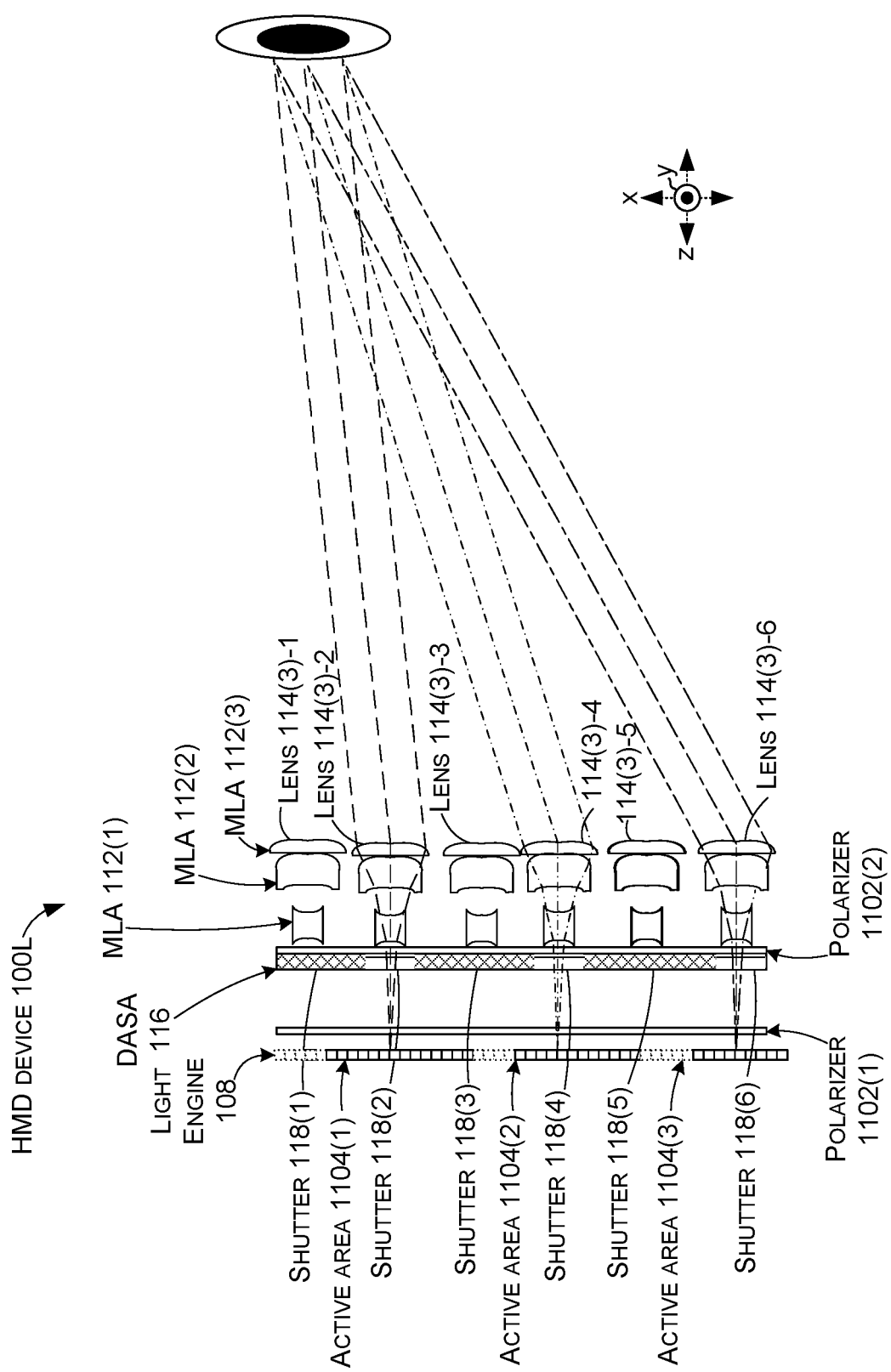

FIGS. 11A-11C collectively show another example HMD device 100L. In this case, the light engine 108 can be manifest as an organic light emitting diode (OLED) panel or an inorganic light emitting diode (ILED), among others. A first polarizer 1102(1) can be positioned between the light engine 108 and the DASA 116. A second polarizer 1102(2) can be positioned between the DASA 116 and MLA 112(1). In this case, the shutters 118 can be square, though other shapes, such as hexagonal can be employed. In this configuration, groups of shutters can be opened to work cooperatively together, while other shutters are closed to prevent cross-talk. For instance, shutters 118(1), 118(3), and 118(5) can be operated together and shutters 118(2), 118(4), and 118(6) can be operated together.

FIG. 11B shows active areas 1104 of the light engine. The active areas can be groups of pixels that are emitting light for a frame or other period. In FIG. 11B, for a first sub-frame, shutters 118(1), 118(3), and 118(5) are opened, while shutters 118(2), 118(4), and 118(6) are closed. Subsequently, as shown in FIG. 11C shutters 118(2), 116(4), and 118(6) could be opened and the others closed, for a second sub-frame.

Active areas 1104 that are directly in front of the user's eye can be centered on the corresponding lens. Active areas that are further off axis can be shifted in consideration of the optical path to the eye. For instance, an optical axis extending perpendicular to the front surface of the user's eye is centered through lens 114(3)-1 and active area 1104(1). In contrast, lens 114(3)-5 is substantially off axis. As a result, the active area 1104(3) can be shifted to reflect the optical path to the eye through the lens. Thus, active area 1104(3) can be shifted slightly toward the bottom of the drawing page relative to lens 114(3)-5.

This implementation sequences different sets or groups of shutters 118 such that at any given time (e.g., sub-frame) only a fraction of the shutters is "open". For example, in a rectangular array of square lenses 114, this might be a checkerboard pattern where half of the lenses are receiving light at any given time. For a hexagonal array of circular or hexagonal lenses, one third of the shutters can be open for a sub-frame and thus one third of lenses are receiving light.

This time-modulation of shutters and thus adjacent lenses, can ensure that crosstalk is minimized while panel pixels that correspond to the users' pupil position are activated relative to each open lens. This also allows each lens to image pixels from an area greater than that of the lens (e.g., from the adjacent active area 1104), permitting a resolution higher than that of the native light engine 108.

From one perspective, when considering FIGS. 11B and 11C, the display areas (e.g., active areas 1104) underneath each active addressable shutter area (e.g., shutters 118) is larger than the spacing between the pitch of the shuttered lenses 114. This configuration can allow a majority of the display area to be used for each sub-frame, which can provide a higher resolution for the HMD device 100L over a plurality of subframes than the native display resolution. Thus, the independently controllable shutters 118 can provide a technical solution of allowing the generation of a perceived image that has a higher resolution than the resolution of the display and is free of cross-talk.

Note that each lens 114 in the MLA 112 can be optimized for imaging the pixels underneath for the eye pupil position corresponding to the user looking at that lens. This can facilitate approximate foveal resolution as it is needed, while permitting degraded performance as the eye is looking elsewhere.

It can also be seen that further away from the center of the light engine, the pitch between the different elements of the lens system (e.g., active areas 1104, the shutters 118, and/or the lenses 114) may also be varied for optimal off-axis performance.

FIG. 12 shows another example HMD device 100M that is similar to the HMD device 100L of FIG. 11. In this case, the light engine 108 can be manifest as a liquid crystal device (LCD) that operates cooperatively with a backlight 1202. Backlights often include a polarizer. Thus, light emitted from the backlight can be selectively emitted in a polarized form through active areas 1104 of the LCD toward the DASA 116. Individual shutters 118 can be opened to allow the light from an adjacent active area 1104 to pass through the shutters and polarizer 1102 before reaching MLA 112(1).

In the configurations described above, the light engines 108, the DASAs 116, and the MLAs 112 are generally planar. An alternative configuration is explained below relative to FIGS. 13A and 13B.

Figure 13A:
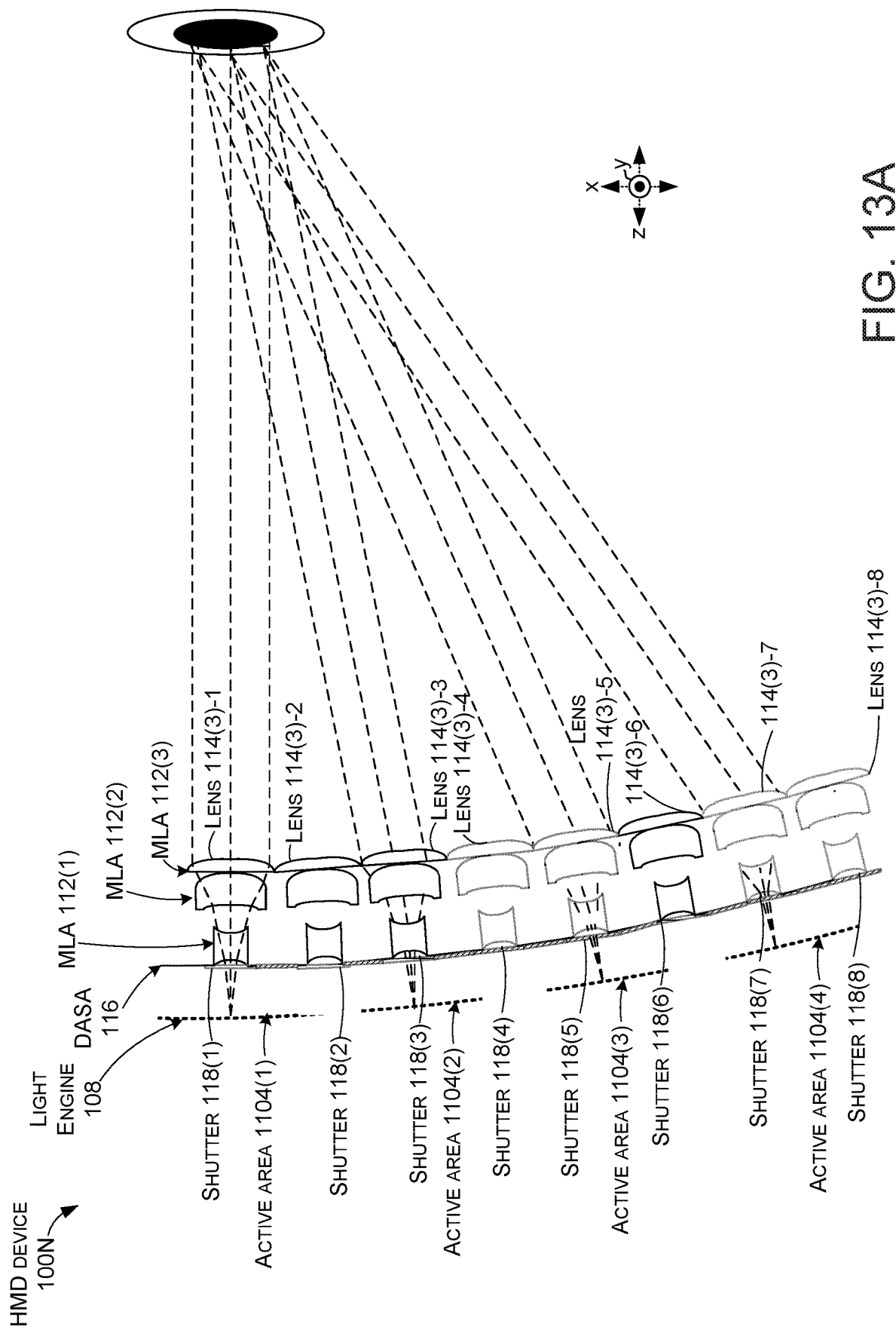
Figure 13B:
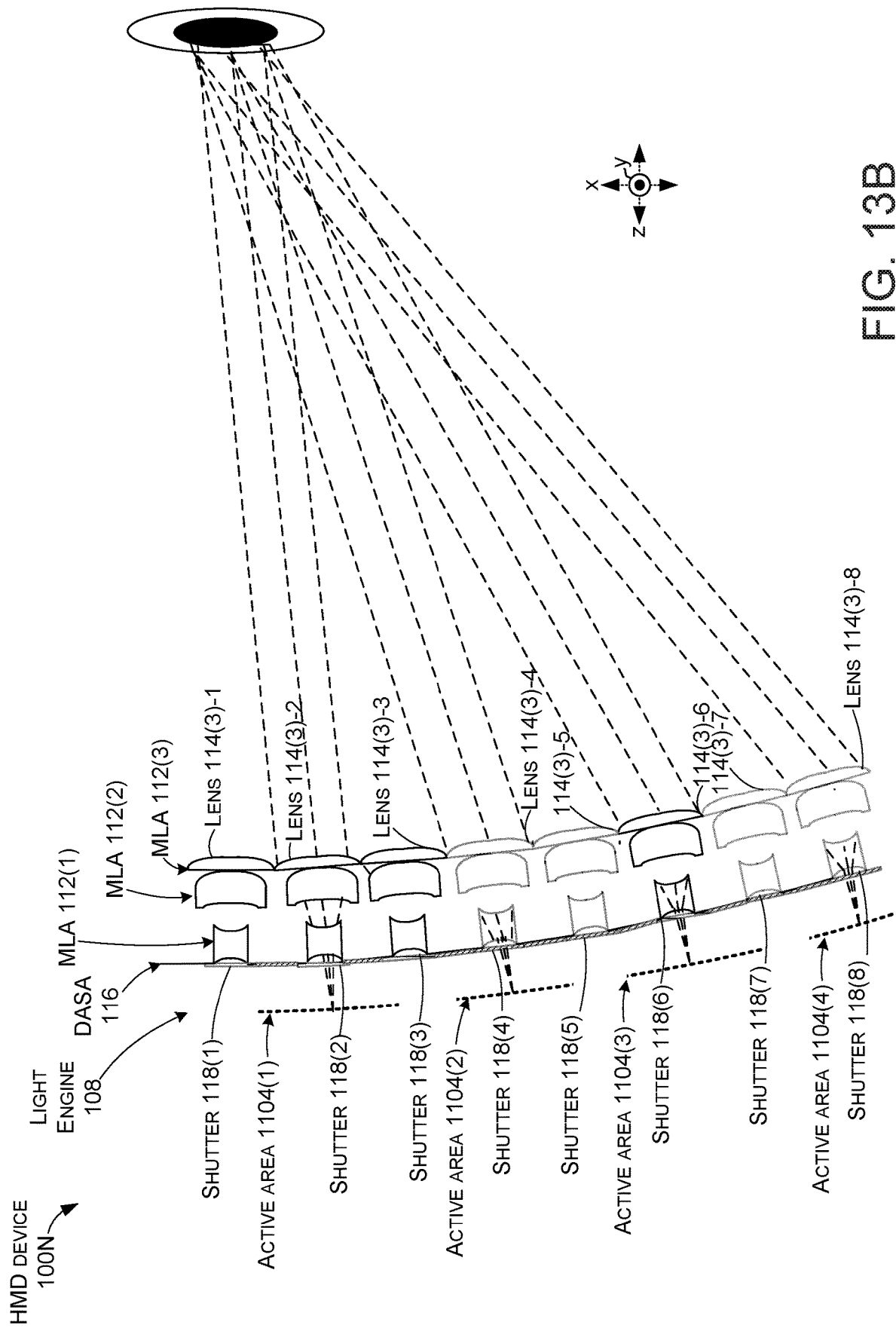

FIGS. 13A and 13B collectively show another example HMD device 100N that is similar to HMD device 100L of FIGS. 11A-11C. In this case, the light engine 108, DASA 116, and the MLAs 112 are arranged along arcs (e.g., curved). The arcuate configuration can follow the shape of the head to produce a more compact HMD device 100N. Further, the arcuate configuration can reduce the optical load on the outer lenses (e.g., in this case lenses 114(6)-114(8) toward the bottom of the drawing page) when compared to a planar configuration.

In this example, shutters 118(1), 118(3), 118(5), and 118(7) can be operated as a group for a first sub-frame and shutters 118(2), 118(4), 118(6), and 118(8) can be operated as a group for a second sub-frame. Alternatively, shutters 118(1), 118(4), and 118(7) can be operated as a first group, shutters 118(2), 118(5), and 118(8) can be operated as a second group, and shutters 118(3) and 118(6) can be operated as a third group, among other configurations. This time modulation of groups of shutters can allow the 'open' lenses to receive light from a large area (e.g., active area 1104) of the light engine while reducing image degradation associated with cross-talk because the adjacent lenses are closed (e.g., the adjacent shutter is closed).

Comparing FIGS. 13A and 13B shows the active area 1104 underneath each active lens 114 can be roughly centered underneath the optical axis defined by the line going from the pupil through the center of the lens. The active areas 1104 can be shifted to remain centered under the open shutters and lenses for an individual sub-frame. For instance, FIG. 13A relates to a first sub-frame. FIG. 13A shows active area 1104(1) centered relative to an optical axis from the user's eye through lens 114(3)1 and open shutter 118(1). Adjacent shutter 118(2) is closed to eliminate cross-talk. FIG. 13B shows the configuration for the second sub-frame where shutter 118(1) is closed and adjacent shutter 118(2) is opened. Correspondingly, active area 1104(1) is shifted to be centered relative to the focal path from the user's eye through lens 114(3)2 and shutter 118(2). Cross-talk is reduced or eliminated because adjacent shutters are closed in each sub-frame. This can allow the active areas 1104 employed in each sub-frame to be increased in size. For instance, the active areas in each sub-frame can entail a majority of the display area (e.g., total pixels). This can allow the user perceived image of the combined sub-frames to have a higher resolution than the resolution of the light engine 108. Stated another way, some pixels can contribute to multiple sub-frames and thus can contribute multiple times to the perceived frame (e.g., image).

The illustrated curved displays (e.g., light engine 108) employed in combination with curved MLAs 112 can make low profile systems where the optics are always close to on-axis for improved performance. This can be especially true for the edges of wide FOV HMD devices.

While fixed shutter positions and sizes are illustrated relative to FIGS. 13A and 13B, recall from the discussion above relative to FIGS. 7A and 7B, that shutters 118 can be adjustable both in size and location depending upon eye position. Thus, eye tracking in combination with an adjustable DASA 116 can allow selection of combinations of pixels and lenses that contribute to a high-resolution image directed into the user's eyes, especially in the foveal regions, while saving resources associated with powering pixels that would not contribute to the perceived image. The resulting images can achieve a higher resolution than the display resolution with little or no cross-talk.

Figure 14:
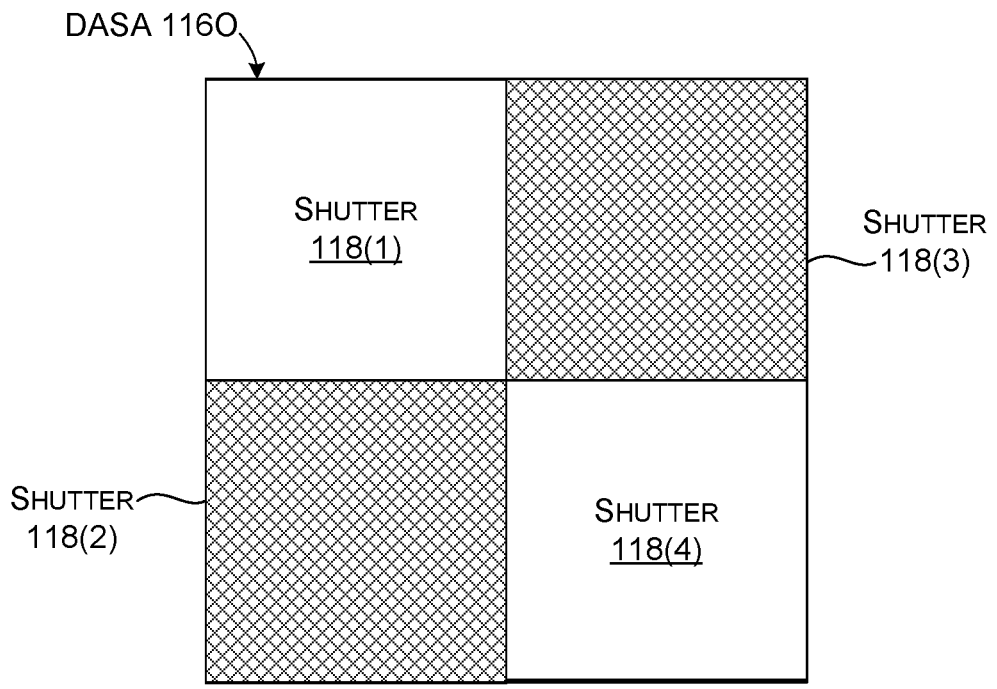
Figure 15A:
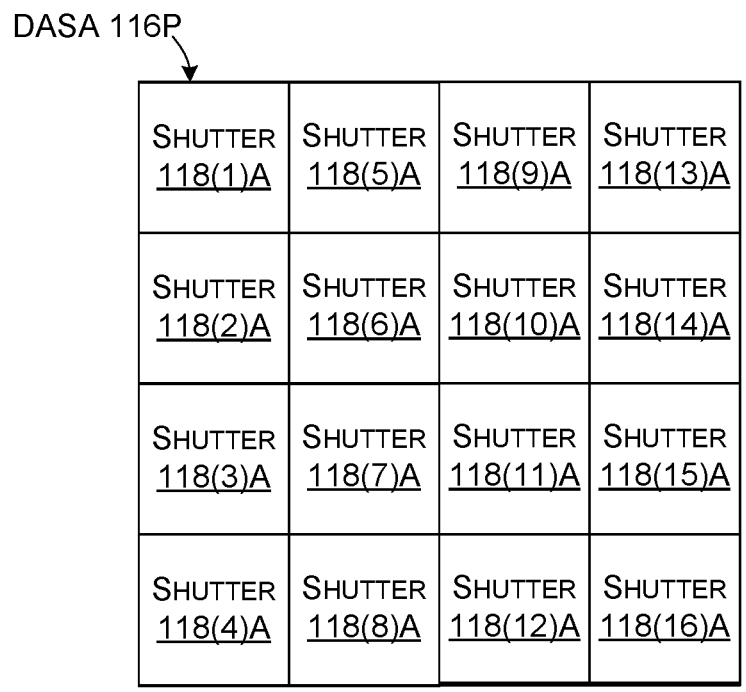
Figure 15B:
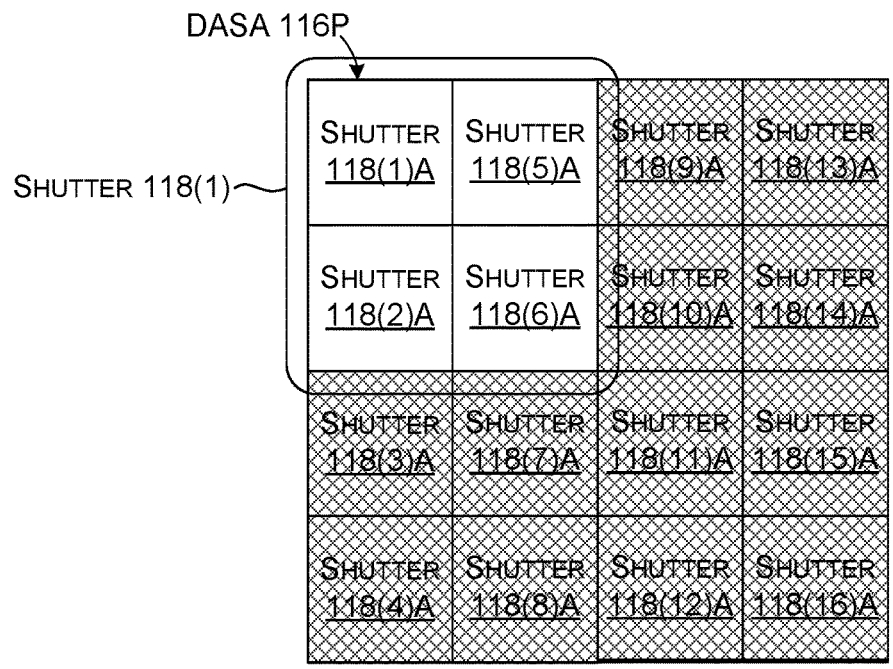
Figure 15C:
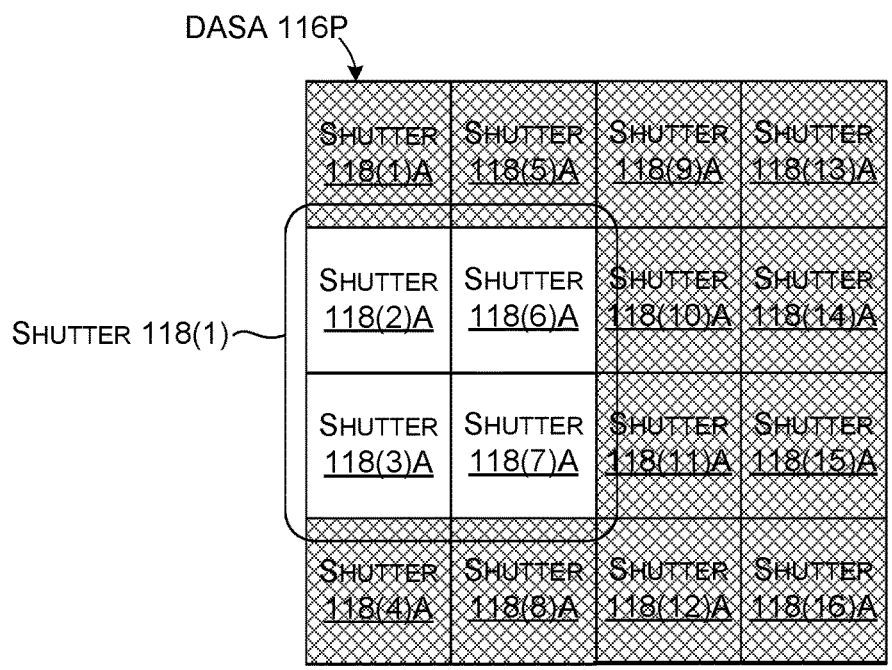

FIGS. 14-15C collectively show example DASAs 1160 and 116P, respectively. As mentioned above, the DASA can entail an array or matrix of independently addressable regions (e.g., shutters 118) that can be controlled to switch between a transmissive state or an opaque state. Examples architectures can include LCD arrays, ferroelectric arrays, and/or twisted nematic liquid crystals arrays, among others. The DASA can be manifest as a passively addressable array or an actively addressable array. Passively addressable arrays can exhibit bi-stability (e.g., the material tends to maintain whatever state it is set in until it is addressed again). For instance, states of the DASA can be set by powering an individual horizontal row of shutters. While the row is powered on, individual columns can be powered on, or not, to set the state of individual shutters. The process then moves down to the next row and the shutters will hold their state until being addressed again. Actively addressable arrays rely on dedicated electronics, such as a transistor and a capacitor to maintain an individual shutter of the array in a given state until it is addressed again.

As shown and discussed relative to several implementations above, the DASA can have an area that is similar to the area of the pixels 120 and/or the lenses 114 of the MLA 112 proximate to the DASA. For instance, FIG. 8 shows a version where the pixels 120, the shutters 118, and the lenses 114 of MLA 112(1) have similar areas. FIG. 14 shows DASA 1160 that is similar to DASA 116 shown in FIG. 8. FIGS. 7A and 7B show a version where the shutters 118 are smaller than the lenses 114. FIG. 15A show an example DASA configuration with relatively small shutters.

DASA 116P of FIG. 15A can be the same overall size (e.g., has the same overall dimensions) as DASA 1160 of FIG. 14. However, in this case, instead of including the four shutters 118 of DASA 1160, DASA 116P includes 16 shutters 118(1)A-118(16)A. (The suffix 'A' is used here for purposes of distinguishing these 16 shutters from shutters 118 from FIGS. 7A, 7B, and 14 which are referenced here for purposes of explanation.) Among other potential advantages, smaller shutters can be collectively controlled to achieve additional functionality. For instance, the smaller shutters can be collectively controlled based upon user eye position and/or gaze direction, among other parameters. This aspect is explained relative to FIGS. 15B and 15C.

FIG. 15B shows shutters 118(1)A-118(4)A collectively being controlled to function as shutter 118(1) illustrated in FIG. 7A. At this point, 118(1)A, 118(2)A, 118(5)A, 118(6)A, are open and adjacent shutters 118(3)A, 118(7)A, 118(9)A, and 118(10)A are closed. Now as shown in FIG. 7B, shutter 118(1) is shifted downward in response to the user's eye moving downward. Responsively, as shown in FIG. 15C, shutter 118(1) is effectively shifted to shutters 118(2)A, 118(3)A, 118(6)A, and 118(7)A, which are now open. Shutters 118(1)A, 118(5)A are closed. (These shutters were then identified as shutter 118(5) in FIG. 7B). Thus, the use of relatively small shutters can solve the technical problem of adjusting to different user eye positions and/or gaze directions despite the pixel and lens positions being fixed. Further, the shutters lend themselves to being operated alone or collectively to achieve a desired shutter size for a particular scenario.

Figure 16:
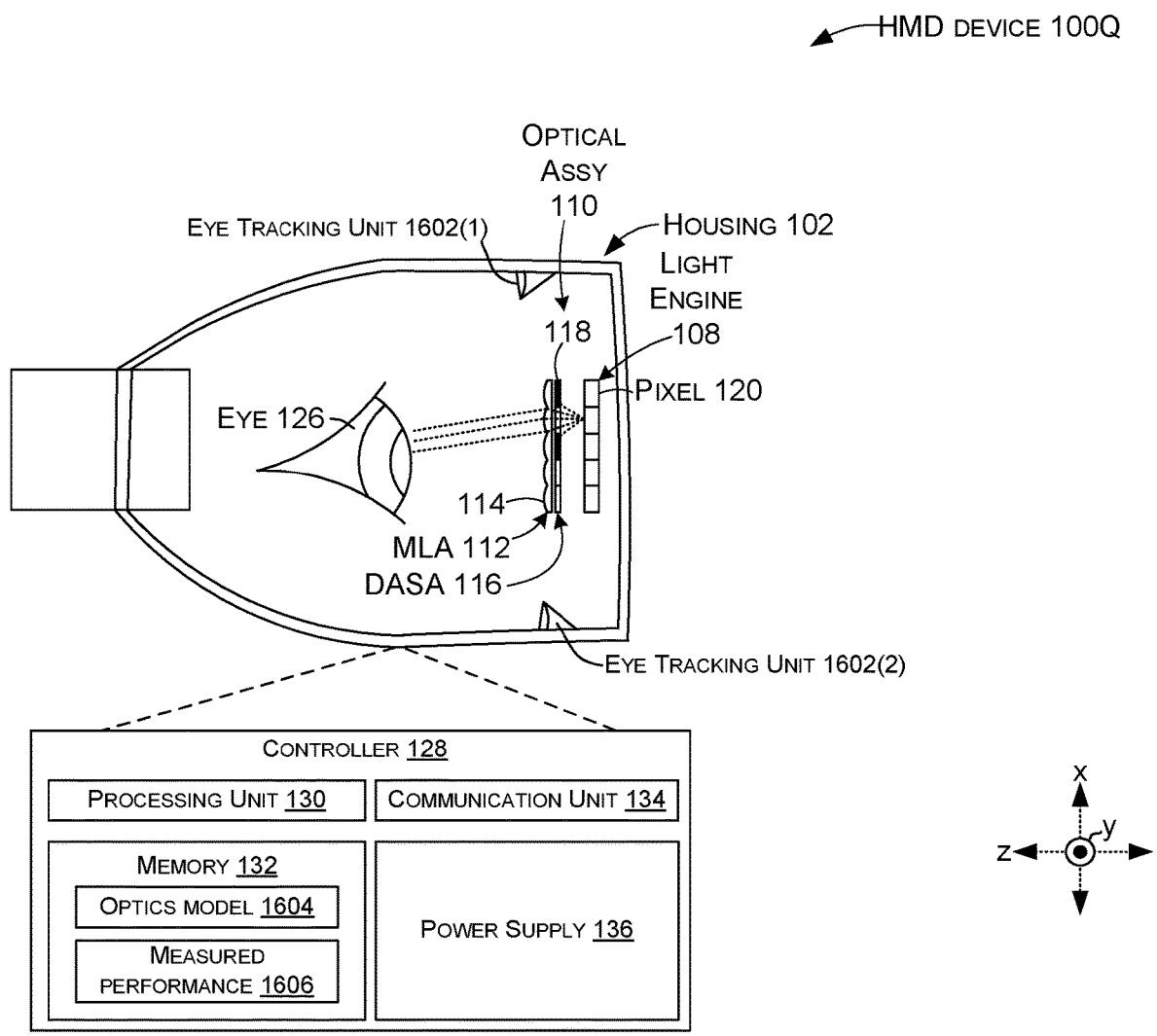

FIG. 16 shows an HMD device 100Q that is similar to HMD device 100 described above relative to FIGS. 1A and 1B and as such, not all components will be re-introduced here. As in that case, HMD device 100Q includes housing 102 that positions the light engine 108 and optical assembly 110 in line with the user's eye 126 along the optical axis (not shown). Eye tracking units 1602 can be positioned on the housing 102 and directed toward the user's eye to detect eye position, gaze direction, and/or pupil size, among others.

Eye-tracking units 1602 may also include a detecting feature that can capture light reflected from a cornea of the user's eye, such as by detecting glints of light and/or other detectable features associated with the user's eye, to determine the pupil position and gaze direction of the eye. Eye tracking units 1602 can further be configured to detect the diameter of the user's pupil, which can be considered by the controller 128 to determine the configuration of the shutter elements associated with the pupil size. While one eye tracking technique is illustrated, other eye tracking techniques are contemplated and can be employed. For instance, electroencephalography (EEG) information can be utilized to track various parameters about the eyes. EEG can be employed alone or in concert with other techniques to derive information about eye parameters that can be useful to operation of the HMD device.

The storage/memory 132 can include an optics model 1604 and/or measured performance (e.g., deviation data) 1606. The optics model 1604 can be derived from the design specifications of the HMD device and can be utilized to predict how illumination of individual pixels 120 will be received by and emerge from the optical assembly 110 to contribute to the eye box. The optical model can identify which lenses to employ based upon various parameters, such as eye position and/or gaze direction among others. The optical model can also indicate which other lenses to block to reduce cross-talk. In another version, the optical model may map various parameters to shutter positions and states.

For instance, the discussion relating to FIGS. 15A-15C describes a scenario where the location of an open shutter is migrated with a change in eye position. The open shutter could alternatively or additionally be changed in size, depending on parameter changes.

HMD device performance can be modelled using software, or measured in a testing scenario, such in a laboratory or manufacturing facility. The measured performance can be obtained by placing a camera modelling the eye at specific distances and orientations from the optical assembly. Each pixel 120 could then be driven at specific parameter values. The optics model will predict the location and intensity of the resulting light rays. Any deviation from the predicted values (e.g., 'correction data') could be stored in the memory in various ways. In one case, a deviation between the predicted value and the measured value could be stored as part of the measured performance. The positions, sizes, and/or states of the shutters 118 of the DASA 116 can be determined from the light rays to correct for variations from the model.

This testing process can be repeated at various parameter values (e.g., intensities) for each pixel 120 in isolation. The process can be repeated for each pixel in isolation and then in combination with each other. The testing can then employ various shutter configurations and states to identify combinations that produce higher quality images. The testing process could be performed directly on the HMD device 100L. Alternatively, the testing process could be performed on one or more devices having a common design specification (e.g., a device model) and then stored on other HMD devices of that model.

The controller 128 can receive image data, such as from a virtual reality application, such as a game. The controller can process the image data in light of the optics model 1604 and/or the measured performance data 1606 and the techniques described above relative to FIGS. 2-15C to determine parameter values for driving the light engine 108 and controlling the shutters 118 of the DASA 116 to produce a corresponding image for the user. Stated another way, the controller 128 can access a mapping table that associates image data to parameter values for the pixels and shutters. The controller can determine how to control the light engine and the DASA based on the current parameter values and the model for individual sub-frames of a frame of image data.

In some implementations, the controller 128 may also employ a feedback mechanism when determining how to display images. For example, a neural network could be utilized that could determine the existence of certain aberrations for specific images, and through machine learning, could determine appropriate parameter values to drive individual pixels and/or shutters in order to correct for such aberrations. Similarly, the neural network could utilize the eye-tracking information to deduce which individual pixels and shutters should be activated or deactivated to ensure that high quality light rays are received at the user's eye.

The term "device", "computer," "computing device," "client device," "server," and/or "server device" as possibly used herein can mean any type of device that has some amount of hardware processing capability and/or hardware storage/memory capability. Processing capability can be provided by one or more hardware processing units 130 and/or other processors (e.g., hardware processing units/cores) that can execute computer-readable instructions to provide functionality. Computer-readable instructions and/or data can be stored on persistent storage or volatile memory. The term "system" as used herein can refer to a single device, multiple devices, etc.

Memory 132 can be storage resources that are internal or external to any respective devices with which it is associated. Memory 132 can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others, which may constitute memory 132.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), holographic processing units (HPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that the components and/or devices described herein can function in a stand-alone or cooperative manner to implement the described techniques. For example, the methods described herein can be performed on a single computing device and/or distributed across multiple computing devices that communicate over one or more network(s). Without limitation, such one or more network(s) can include one or more local area networks (LANs), wide area networks (WANs), the Internet, and the like.

Example Methods

Figure 17:
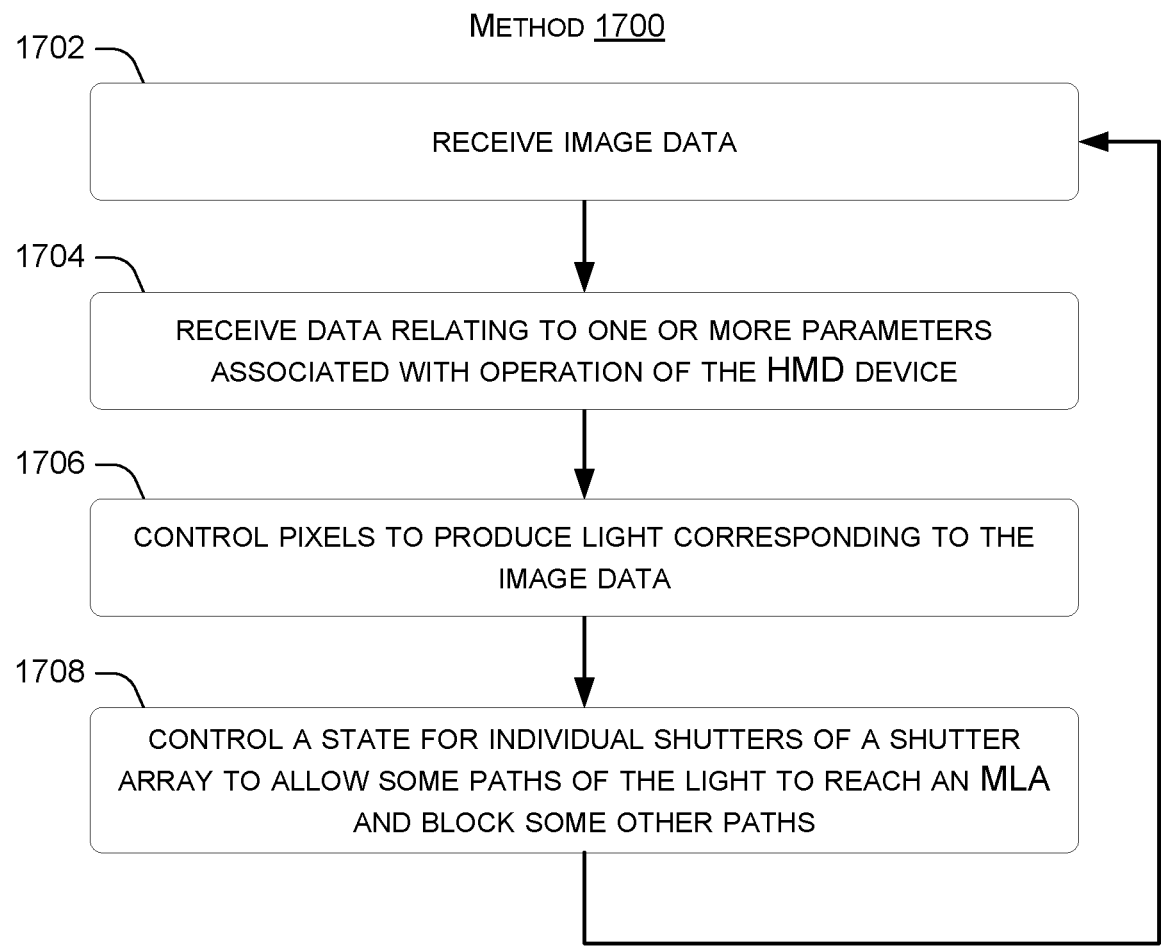
FIGS. 17 and 18 illustrate example methods or techniques that are consistent with some implementations of the present concepts.

The following discussion presents an overview of the functionality associated with controlling what light reaches an MLA in an HMD device. FIG. 17 illustrates an example method 1700, consistent with the present concepts. Method 1700 can be implemented by a single device, e.g., HMD device 100, or various steps can be distributed over one or more servers, client devices, etc. Moreover, method 1700 can be performed by one or more components, such as controller 128 and/or by other components and/or devices.

At block 1702, the method can receive image data. The image data could be received from a virtual reality application running on an HMD device and/or from a cloud-based application that is communicatively coupled to the HMD device, among other examples.

At block 1704, the method can receive data relating to one or more parameters associated with operation of the HMD device. For instance, the parameters could relate to user eye position. The parameters may also relate to a model of the HMD device and/or deviations from the model.

At block 1706, the method can control pixels to produce light corresponding to the image data. The pixel controls can affect color and/or brightness of the light.

At block 1708, the method can control a state for individual shutters of a shutter array to allow some paths of the light to reach an MLA and block some other paths. For instance, paths through adjacent lenses of the MLA can be blocked to reduce image degradation, such as from crosstalk. This configuration can allow individual lenses to image pixels from an area greater than that of the lens, permitting a resolution higher than that of the pixel resolution.

Controlling the state of the shutters based upon the parameters can allow individual lenses in the MLA to be optimized for imaging the pixels underneath for the eye pupil position corresponding to the user looking at that lens. This can facilitate approximate foveal resolution as it is needed, while permitting degraded performance as the eye is looking elsewhere.

Further the operating parameters can include the distance of the lens from the display center. The location and/or pitch of the lens and the corresponding shutter may reflect this information for optimal off-axis performance.

Figure 18:
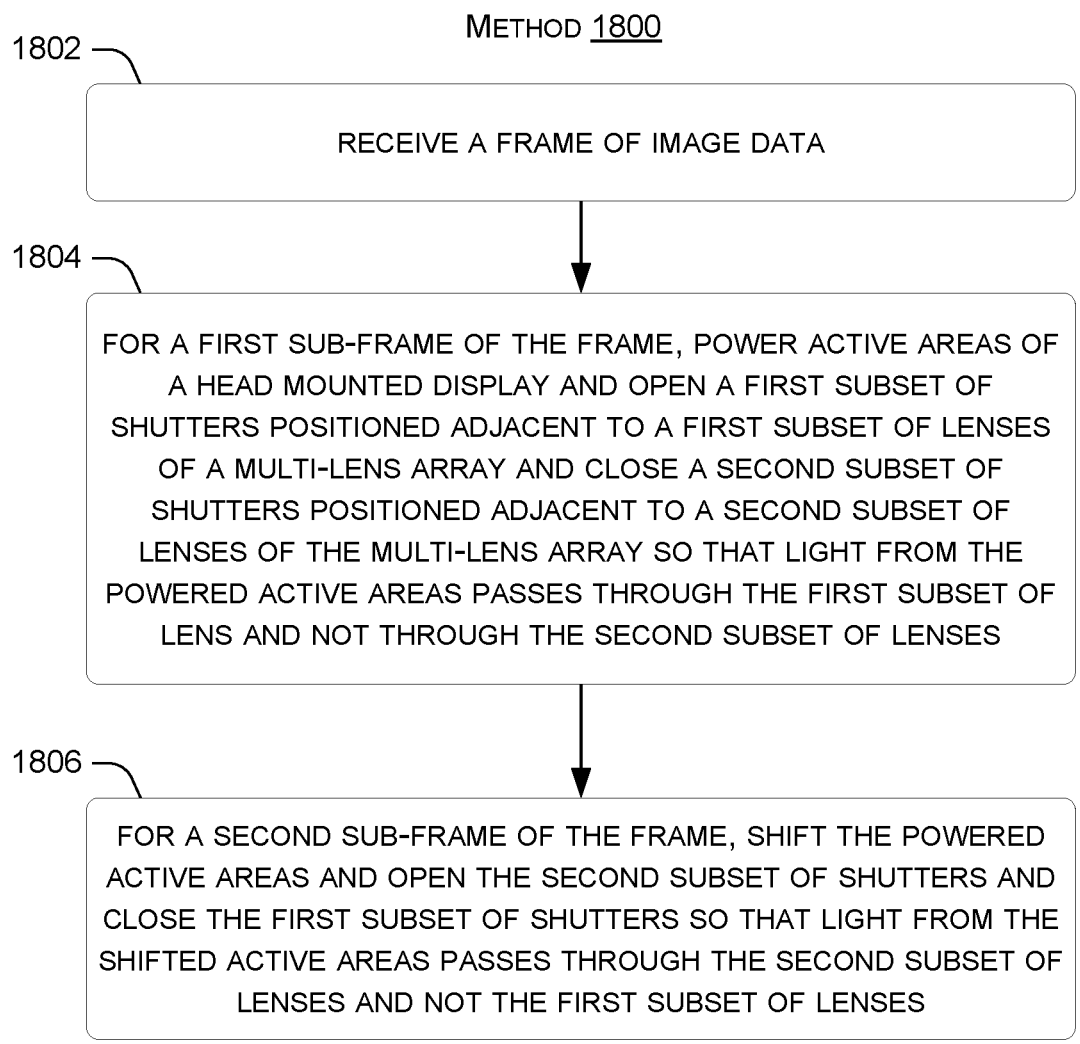

FIG. 18 illustrates another example method 1800, consistent with the present concepts. Method 1800 can be implemented by a single device, e.g., HMD device 100, or various steps can be distributed over one or more servers, client devices, etc. Moreover, method 1800 can be performed by one or more components, such as controller 128 and/or by other components and/or devices.

At block 1802, the method can receive a frame of image data.

At block 1804, the method can for a first sub-frame of the frame, power active areas of a head mounted display and open a first subset of shutters positioned adjacent to a first subset of lenses of a multi-lens array and close a second subset of shutters positioned adjacent to a second subset of lenses of the multi-lens array so that light from the powered active areas passes through the first subset of lens and not through the second subset of lenses.

At block 1806, the method can for a second sub-frame of the frame, shift the powered active areas and open the second subset of shutters and close the first subset of shutters so that light from the shifted active areas passes through the second subset of lenses and not the first subset of lenses. It will be understood that additional blocks for additional sub-frames can also be used for different configurations (e.g., Hexagonal lens arrays). Examples of such configurations are described above.

As mentioned above, the first subset of shutters and the second subset of shutters can collectively define a checkerboard pattern. In an alternative configuration, a third subset of shutters can be employed. The first, second, and third subsets can be employed in a hexagonal arrangement, among others. In either configuration, in each sub-frame the active areas can comprise a majority of the display area.

The powering and shifting can entail time-multiplexing that can be accomplished at a fast enough frame rate such that individual sub-frames are not discernable by a human user. For instance, a frame rate of at least 60 frames per second is sufficient for most people.

In some cases, individual active areas can be larger than a spacing between a pitch of individual lenses aligned with the closed shutters. This can allow a majority of the display area of the head mounted display to be used for each sub-frame, which allows for higher combined resolution for the combined first and second subframes than a native display resolution.

These methods can permit resolution enhancement using the same switchable shutters+faster refresh display panel that enhances MLA-based architecture while reducing crosstalk issues. The resolution enhancement can facilitate using larger panel pixels than otherwise required, and can be used selectively to provide the highest resolution where the user is looking (foveation), among other potential advantages.

Various examples are described above. Additional examples are described below. One example includes a head mounted display device comprising a light engine configured to control pixels to generate light corresponding to image data, a housing configured to be positioned relative to a head of a user and to position the light engine in front of an eye of the user, and an optical assembly positioned by the housing between the light engine and the eye. The optical assembly comprises a multi-lens array and a dynamically addressable shutter array interposed between the light engine and the multi-lens array.

Another example can include any of the above and/or below examples where the dynamically addressable shutter array comprises multiple shutters.

Another example can include any of the above and/or below examples where individual shutters are fixed in size and location, or wherein individual shutters can be adjusted in size and/or changed in location.

Another example can include any of the above and/or below examples where the multi-lens array comprises multiple lenses, and wherein all of the lenses are the same size or wherein individual lenses are different in size from at least some other of the multiple lenses.

Another example can include any of the above and/or below examples where an individual shutter is positioned adjacent to an individual lens, and wherein the individual shutter is the same size as the individual lens, or wherein the individual shutter is smaller than the individual lens.

Another example can include any of the above and/or below examples where the multi-lens array comprises a first multi-lens array and further comprising a second multi-lens array positioned on an opposite side of the first multi-lens array from the dynamically addressable shutter array.

Another example can include any of the above and/or below examples where the first multi-lens array is identical to the second multi-lens array, or wherein the first multi-lens array is different than the second multi-lens array.

Another example can include any of the above and/or below examples where the head mounted display device further comprises a fixed isolation structure that optically isolates pairs of lenses from the first multi-lens array and the second multi-lens array.

Another example can include any of the above and/or below examples where the dynamically addressable shutter array comprises a first dynamically addressable shutter array and further comprising a second dynamically addressable shutter array interposed between the first multi-lens array and the second multi-lens array.

Another example can include any of the above and/or below examples where the head mounted display device further comprises a third multi-lens array and a third dynamically addressable shutter array interposed between the second multi-lens array and the third multi-lens array.

Another example can include any of the above and/or below examples where the first multi-lens array, the second multi-lens array, and the third multi-lens array comprise the same number of lenses.

Another example can include any of the above and/or below examples where the dynamically addressable shutter array comprises a passively addressable array or an actively addressable array.

Another example can include any of the above and/or below examples where the dynamically addressable shutter array comprises an LCD array, and wherein the LCD array comprises a ferroelectric array, and/or a twisted nematic array.

Another example can include any of the above and/or below examples where the multi-lens array and the dynamically addressable shutter array are planar.

Another example can include any of the above and/or below examples where the multi-lens array and the dynamically addressable shutter array are curved.

Another example includes a head mounted display device comprising a light engine configured to generate light corresponding to image data, a housing having an inwardly facing side and an outwardly facing side, the inwardly facing side configured to be engaged by a head of a user to position the housing relative to an eye of the user, and an optical assembly positioned by the housing on the inwardly facing side of the light engine, the optical assembly comprising a multi-lens array and a dynamically addressable shutter array comprising multiple shutters that can be individually transitioned from a transmissive state to an opaque state.

Another example can include any of the above and/or below examples where the light engine comprises multiple pixels, and wherein the number of pixels is the same as the number of multiple shutters.

Another example can include any of the above and/or below examples where the multi-lens array comprises multiple lenses having identical shapes and sizes and wherein the number of multiple shutters is equal to or greater than the number of lenses.

Another example can include any of the above and/or below examples where the multi-lens array comprises multiple lenses and wherein the number of multiple shutters is greater than the number of lenses.

Another example includes a head mounted display device comprising a layer of individually controllable pixels that can be energized to emit light, a layer of lenses that are physically aligned over the pixels, and a layer of shutters interposed between the pixels and the lenses and configured to be independently transitioned between a transmissive state and an opaque state to limit paths of the emitted light that reach the layer of lenses.

Another example includes a device implemented method comprising receiving a frame of image data, for a first sub-frame of the frame, powering active areas of a head mounted display and opening a first subset of shutters positioned adjacent to a first subset of lenses of a multi-lens array and closing a second subset of shutters positioned adjacent to a second subset of lenses of the multi-lens array so that light from the powered active areas passes through the first subset of lens and not through the second subset of lenses, and for a second sub-frame of the frame, shifting the powered active areas and opening the second subset of shutters and closing the first subset of shutters so that light from the shifted active areas passes through the second subset of lenses and not the first subset of lenses.

Another example can include any of the above and/or below examples where the first subset of shutters and the second subset of shutters collectively comprise a checkerboard pattern.

Another example can include any of the above and/or below examples where the active areas collectively comprise a majority of an area of the head mounted display.

Another example can include any of the above and/or below examples where the powering and the shifting comprise time-multiplexing that is accomplished at a frame rate such that the sub-frames are not discernable by a human user and the sub-frames collectively define an image perceived by the human user of the frame.

Another example can include any of the above and/or below examples where the frame rate is at least 60 frames per second.

Another example can include any of the above and/or below examples where the method further comprises selecting a location and/or size of the shutters of the first subset and the second subset based at least in part on parameters relating to an eye of a user.

Another example can include any of the above and/or below examples where the parameters relate to location, gaze direction, and/or offset from an optical axis of the eye of the user.

Another example can include any of the above and/or below examples where individual active areas are larger than a spacing between a pitch of individual lenses aligned with the closed shutters, such that a majority of display area of the head mounted display is used for each sub-frame, allowing for higher combined resolution for the combined first and second subframes than a native display resolution.

Another example can include any of the above and/or below examples where the method further comprises for a third sub-frame of the frame, further shifting the powered active areas and opening a third subset of shutters and closing the first subset of shutters and the second subset of shutters so that light from the further shifted active areas passes through the third subset of shutters and a corresponding third subset of lenses and not the first subset of lenses or the second subset of lenses.

Another example can include any of the above and/or below examples where the method further comprises receiving another frame of image data, and repeating the powering, the shifting and the further shifting for the another frame.

CONCLUSION

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims and other features and acts that would be recognized by one skilled in the art are intended to be within the scope of the claims.

The invention claimed is:

1. A head mounted display device, comprising:
a light engine configured to control pixels to generate light corresponding to image data;

a housing configured to be positioned relative to a head of a user and to position the light engine in front of an eye of the user along an optical axis; and, an optical assembly positioned by the housing between the light engine and the eye, the optical assembly comprising:

a first multi-lens array positioned proximate to the light engine;

a first dynamically addressable shutter array interposed between the light engine and the first multi-lens array;

a second multi-lens array positioned distal to the light engine relative to the first multi-lens array; and, a second dynamically addressable shutter array interposed between the first multi-lens array and the second multi-lens array.

2. The head mounted display device of claim 1, wherein the first dynamically addressable shutter array comprises multiple shutters.

3. The head mounted display device of claim 2, wherein individual shutters are fixed in size and location, or wherein individual shutters can be adjusted in size and/or changed in location.

4. The head mounted display device of claim 3, wherein the first multi-lens array comprises multiple lenses, and wherein all of the lenses are the same size or wherein individual lenses are different in size from at least some other of the multiple lenses.

5. The head mounted display device of claim 4, wherein an individual shutter is positioned adjacent to an individual lens, and wherein the individual shutter is the same size as the individual lens, or wherein the individual shutter is smaller than the individual lens.

6. The head mounted display device of claim 1, wherein the first multi-lens array is identical to the second multi-lens array, or wherein the first multi-lens array is different than the second multi-lens array.

7. The head mounted display device of claim 1, further comprising a third multi-lens array and a third dynamically addressable shutter array interposed between the second multi-lens array and the third multi-lens array.

8. A head mounted display device, comprising:

a layer of individually controllable pixels that can be energized to emit light;

a multi-lens array physically aligned over the pixels;

a layer of shutters interposed between the pixels and the multi-lens array and configured to be independently transitioned between a transmissive state and an opaque state to limit paths of the emitted light that reach the multi-lens array; and, a controller configured to control a first shutter of the layer of shutters and a second adjacent shutter of the layer of shutters relative to an individual pixel for an image frame and for a first sub-frame of the image frame to transition the first shutter to the transmissive state and the second adjacent shutter to the opaque state to provide a first image path for light from the individual pixel and for a second sub-frame of the image frame to transition the first shutter to the opaque state and the second adjacent shutter to the transmissive state to provide a second image path for light from the individual pixel to collectively contribute light from the individual pixel toward an eye box for the image frame.

9. A device implemented method, comprising:

receiving a frame of image data;

for a first sub-frame of the frame, powering active areas of a head mounted display, selecting a location and/or size of a first subset of shutters based at least in part on parameters relating to an eye of a user, opening the first subset of shutters positioned adjacent to a first subset of lenses of a multi-lens array and closing a second subset of shutters positioned adjacent to a second subset of lenses of the multi-lens array so that light from the powered active areas passes through the first subset of lens and not through the second subset of lenses; and, for a second sub-frame of the frame, shifting the powered active areas, selecting a location and/or size of the second subset of shutters based at least in part on the parameters relating to the eye of the user, and opening the second subset of shutters and closing the first subset of shutters so that light from the shifted active areas passes through the second subset of lenses and not the first subset of lenses.

10. The method of claim 9, wherein the first subset of shutters and the second subset of shutters collectively comprise a checkerboard pattern.

11. The method of claim 9, wherein the active areas collectively comprise a majority of an area of the head mounted display.

12. The method of claim 9, wherein the powering and the shifting comprise time-multiplexing that is accomplished at a frame rate such that the sub-frames are not discernable by the user and the sub-frames collectively define an image perceived by the user of the frame.

13. The method of claim 12, wherein the frame rate is at least 60 frames per second.

14. The method of claim 9, further comprising selecting a location and/or size of the shutters of the first subset and the second subset based at least in part on parameters relating to a location of the eye of the user.

15. The method of claim 14, wherein the parameters further relate to gaze direction, and/or offset from an optical axis of the eye of the user.

16. The method of claim 9, wherein individual active areas are larger than a spacing between a pitch of individual lenses aligned with the closed shutters, such that a majority of display area of the head mounted display is used for each sub-frame, allowing for higher combined resolution for the combined first and second subframes than a native display resolution.

17. The method of claim 9, further comprising for a third sub-frame of the frame, further shifting the powered active areas and opening a third subset of shutters and closing the first subset of shutters and the second subset of shutters so that light from the further shifted active areas passes through the third subset of shutters and a corresponding third subset of lenses and not the first subset of lenses or the second subset of lenses.

\* \* \* \* \*